(12) United States Patent
Pomering

(10) Patent No.: US 12,262,772 B2
(45) Date of Patent: Apr. 1, 2025

(54) HELMET

(71) Applicant: MIPS AB, Täby (SE)

(72) Inventor: Amy Pomering, Täby (SE)

(73) Assignee: MIPS AB, Täby (SE)

( * ) Notice: Subject to any disclaimer, the term of this patent is extended or adjusted under 35 U.S.C. 154(b) by 446 days.

(21) Appl. No.: 17/622,017

(22) PCT Filed: Jun. 22, 2020

(86) PCT No.: PCT/EP2020/067308
§ 371 (c)(1),
(2) Date: Dec. 22, 2021

(87) PCT Pub. No.: WO2020/260185
PCT Pub. Date: Dec. 30, 2020

(65) Prior Publication Data
US 2022/0232925 A1 Jul. 28, 2022

(30) Foreign Application Priority Data
Jun. 24, 2019 (GB) ..................................... 1908997

(51) Int. Cl.
*A42B 3/06* (2006.01)
*C08L 73/00* (2006.01)

(52) U.S. Cl.
CPC ............... *A42B 3/064* (2013.01); *A42B 3/06* (2013.01); *C08L 73/00* (2013.01)

(58) Field of Classification Search
CPC ............ A42B 3/064; A42B 3/06; C08L 73/00

USPC ......................................................... 524/599
See application file for complete search history.

(56) References Cited

U.S. PATENT DOCUMENTS

| 9,249,274 B2 * | 2/2016 | Bruno ........................ C08J 9/42 |
| 10,492,557 B2 * | 12/2019 | Grinneback ........... A42B 3/064 |
| 2012/0186003 A1 | 7/2012 | Heger et al. |
| 2017/0049178 A1 | 2/2017 | Durocher |
| 2018/0092423 A1 | 4/2018 | Grinneback et al. |
| 2018/0168268 A1 * | 6/2018 | Grinneback ........... A42B 3/064 |

FOREIGN PATENT DOCUMENTS

| CA | 2990314 | 1/2017 |
| CN | 107075244 | 8/2017 |
| CN | 107847003 | 3/2018 |
| EP | 0661470 | 7/1995 |
| EP | 0705991 | 4/1996 |
| JP | 2005256186 | 9/2005 |

(Continued)

OTHER PUBLICATIONS

"Poketone Definition." Poly-Ketone, http://www.poly-ketone.com/en/polyketone/definition.do. Accessed Jan. 3, 2019.

(Continued)

*Primary Examiner* — Ling Siu Cho
*Assistant Examiner* — Ronald Grinsted
(74) *Attorney, Agent, or Firm* — NORTON ROSE FULBRIGHT US LLP

(57) ABSTRACT

The present invention provides a helmet, comprising first and second components having a sliding interface between them, wherein the sliding interface is provided between respective sliding surfaces of the first and second components, and the first component comprises a polyketone.

15 Claims, 10 Drawing Sheets

(56) References Cited

FOREIGN PATENT DOCUMENTS

| JP | 2016/047971 | 4/2016 | |
|---|---|---|---|
| KR | 20160139432 | 12/2016 | |
| KR | 20160139432 A | * 12/2016 | |
| WO | WO 2001/045526 | 6/2001 | |
| WO | WO 2011/139224 | 11/2011 | |
| WO | WO 2017/157765 | 9/2017 | |
| WO | WO 2019/101816 | 5/2019 | |
| WO | WO 2020/115063 | 6/2020 | |
| WO | WO 2020/115157 | 6/2020 | |

OTHER PUBLICATIONS

A Shulman, Schulaketon MV—Technical data sheet (Nov. 2018), A Shulman.
Hyosung Polyketone, M630A—Technical Data sheet (Oct. 2013).
Hyosung Polyketone, Poketone M200HSL—Technical Data sheet.
Hyosung Polyketone, Poketone P100A—Technical Data sheet.
Hyosung Polyketone, Poketone Polymer M630A—Technical Data sheet.
Hyosung Polyketone, Poketone Polymer M930A—Technical Data sheet.
Ildar Farkhatdinov. Modelling verticality estimation during locomotion. Automatic. Université Pierre et Marie Curie—Paris VI, 2013. English. tel-00993270.
International Search Report and Written Opinion issued in Corresponding PCT application No. PCT/EP2020/067308, dated Sep. 7, 2020.
Kleiven, S. "Evaluation of head injury criteria using an FE model validated against experiments on localized brain motion, intracerebral acceleration, and intra-cranial pressure" *International Journal of Crashworthiness* 2006, 11(1), 65-79.
Kleiven, S. "Predictors for Traumatic Brain Injuries Evaluated through Accident Reconstructions" *Stapp Car Crash Journal* 2007, 51, 81-114.
Kleiven, S. *Finite Element Modeling of the Human Head*. 2002. Technical Report Sep. 2002, Department of Aeronautics, Royal Institute of Technology, Stockholm, Sweden, Doctoral Thesis.
Lommerts B. J. "Chapter 2 Structure and Melting of Perfectly Alternating Ethylene-Carbon Monoxide Copolymers." *Structure development in polyketone and polyalcohol fibers*, University of Groningen, 1994, 7-35.
POKETONE technical Guidebook. Hyosung Polyketone, 2007.

* cited by examiner

HELMET

CROSS-REFERENCE TO RELATED APPLICATIONS

This application is a national phase application under 35 U.S.C. § 371 of International Application No. PCT/EP2020/067308, filed Jun. 22, 2020, which claims priority to and the benefit of United Kingdom Patent Application No. 1908997.8, filed Jun. 24, 2019. The contents of the referenced patent applications are incorporated into the present application by reference.

BACKGROUND

Field of the Disclosure

The present invention relates to helmets. In particular the present invention relates to helmets that include a sliding interface between two components.

Description of Related Art

Helmets are known for use in various activities. These activities include combat and industrial purposes, such as protective helmets for soldiers and hard-hats or helmets used by builders, mine-workers, or operators of industrial machinery for example. Helmets are also common in sporting activities. For example, protective helmets may be used in ice hockey, cycling, motorcycling, motor-car racing, skiing, snowboarding, skating, skateboarding, equestrian activities, American football, baseball, rugby, soccer, cricket, lacrosse, climbing, golf, airsoft and paintballing.

Helmets can be of fixed size or adjustable, to fit different sizes and shapes of head. In some types of helmet, e.g. commonly in ice-hockey helmets, the adjustability can be provided by moving parts of the helmet to change the outer and inner dimensions of the helmet. This can be achieved by having a helmet with two or more parts which can move with respect to each other. In other cases, e.g. commonly in cycling helmets, the helmet is provided with an attachment device for fixing the helmet to the user's head, and it is the attachment device that can vary in dimension to fit the user's head whilst the main body or shell of the helmet remains the same size. In some cases, comfort padding within the helmet can act as the attachment device. The attachment device can also be provided in the form of a plurality of physically separate parts, for example a plurality of comfort pads which are not interconnected with each other. Such attachment devices for seating the helmet on a user's head may be used together with additional strapping (such as a chin strap) to further secure the helmet in place. Combinations of these adjustment mechanisms are also possible.

Helmets are often made of an outer shell, that is usually hard and made of a plastic or a composite material, and an energy absorbing layer called a liner. In other arrangements, such as a rugby scrum cap, a helmet may have no hard outer shell, and the helmet as a whole may be flexible. In any case, nowadays, a protective helmet has to be designed so as to satisfy certain legal requirements which relate to inter alia the maximum acceleration that may occur in the centre of gravity of the brain at a specified load. Typically, tests are performed, in which what is known as a dummy skull equipped with a helmet is subjected to a radial blow towards the head. This has resulted in modern helmets having good energy-absorption capacity in the case of blows radially against the skull. Progress has also been made (e.g. WO 2001/045526 and WO 2011/139224, which are both incorporated herein by reference, in their entireties) in developing helmets to lessen the energy transmitted from oblique blows (i.e. which combine both tangential and radial components), by absorbing or dissipating rotation energy and/or redirecting it into translational energy rather than rotational energy. (It may be also be noted that one reference which describes a helmet that is said to offer protection against both linear acceleration and rotational acceleration is US2012186003—the helmet in this reference comprises a first layer and a second layer being oppositely disposed to the first layer, with the two layers enclosing a space filled with an energy dissipating fluid; however it may be noted that there is no sliding interface between the surfaces of two layers that are in contact in this helmet, since they are separated by the aforementioned fluid.)

Such oblique impacts (in the absence of protection) result in both translational acceleration and angular acceleration of the brain. Angular acceleration causes the brain to rotate within the skull creating injuries on bodily elements connecting the brain to the skull and also to the brain itself.

Examples of rotational injuries include Mild Traumatic Brain Injuries (MTBI) such as concussion, and Severe Traumatic Brain Injuries (STBI) such as subdural haematomas (SDH), bleeding as a consequence of blood vessels rapturing, and diffuse axonal injuries (DAI), which can be summarized as nerve fibres being over stretched as a consequence of high shear deformations in the brain tissue.

Depending on the characteristics of the rotational force, such as the duration, amplitude and rate of increase, either concussion, SDH, DAI or a combination of these injuries can be suffered. Generally speaking, SDH occur in the case of accelerations of short duration and great amplitude, while DAI occur in the case of longer and more widespread acceleration loads.

In helmets such as those disclosed in WO 2001/045526 and WO 2011/139224 that may reduce the rotational energy transmitted to the brain caused by oblique impacts, two parts of the helmet may be configured to slide relative to each other following an oblique impact. Connectors may be provided that, whilst connecting the parts of a helmet together, permit movement of the parts relative to each other under an impact.

In order to provide such a helmet, it may be desirable to provide two components that can slide relative to each other, providing a sliding interface. It may also be desirable to be able to provide such a sliding interface without substantially increasing the manufacturing costs and/or effort.

SUMMARY OF THE INVENTION

According to an aspect of the invention, there is provided a helmet, comprising first and second components having a sliding interface between them, wherein the sliding interface is provided between respective sliding surfaces of the first and second components, and the first component comprises a polyketone.

Preferred aspects of the first and second components are discussed further below.

In a first arrangement, the helmet comprises at least one section having first and second layers, configured in use to be respectively further from the local surface of the head of a wearer of the helmet and closer to the local surface of the head of a wearer of the helmet; and the helmet is configured such that, in response to an impact on the helmet, the first layer can move relative to the second layer in a direction tangential to the local surface of the head.

In a second arrangement, the first layer may comprise a relatively hard outer shell; the second layer may comprise a shell formed from an impact energy absorbing material; and one of the first and second layers may comprise the first component.

In a third arrangement, the first and second layers may comprise shells formed from an impact energy absorbing material; and one of the first and second layers may comprises the first component.

In a fourth arrangement, the first layer may comprise a shell formed from an impact energy absorbing material; the second layer may not absorb a significant proportion of impact energy in comparison to the first layer, and one of the first and second layers may comprise the first component. The second layer may comprise comfort padding.

In a fifth arrangement (which may be an embodiment of the first arrangement defined above), the helmet may further comprise a connector, configured to connect the first and second layers of the helmet together but permit relative movement in the direction tangential to the local surface of the head in response to an impact on the helmet; and the connector may comprise at least one of the first component and the second component.

In a sixth arrangement (which may be an embodiment of the second, third or fourth arrangement defined above), the helmet may further comprise a connector, configured to connect the first and second layers of the helmet together but permit relative movement in the direction tangential to the local surface of the head in response to an impact on the helmet;

wherein the connector comprises at least one of a second first component and a second component.

BRIEF DESCRIPTION OF THE DRAWINGS

The invention is described in detail, below, with reference to the accompanying figures, in which.

Figure 1:
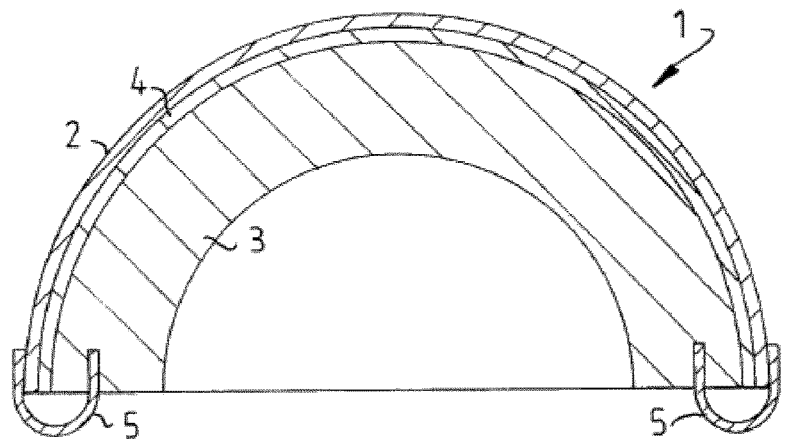
FIG. 1 depicts a cross-section through a helmet for providing protection against oblique impacts.

The proportions of the thicknesses of the various layers in the helmets depicted in the figures have been exaggerated in the drawings for the sake of clarity and can of course be adapted according to need and requirements.

DETAILED DESCRIPTION OF THE INVENTION

FIG. 1 depicts a first helmet 1 of the sort discussed in WO 01/45526, intended for providing protection against oblique impacts. This type of helmet could be any of the types of helmet discussed above.

Protective helmet 1 is constructed with an outer shell 2 and, arranged inside the outer shell 2, an inner shell 3 that is intended for contact with the head of the wearer.

Arranged between the outer shell 2 and the inner shell 3 is a sliding layer 4 or a sliding facilitator, which may enable displacement between the outer shell 2 and the inner shell 3. In particular, a sliding layer 4 or sliding facilitator may be configured such that sliding may occur between two parts during an impact. For example, it may be configured to enable sliding under forces associated with an impact on the helmet 1 that is expected to be survivable for the wearer of the helmet 1. In some arrangements, it may be desirable to configure the sliding layer or sliding facilitator such that the coefficient of friction is between 0.001 and 0.3 and/or below 0.15.

Arranged in the edge portion of the helmet 1, in the FIG. 1 depiction, may be one or more connecting members 5 which interconnect the outer shell 2 and the inner shell 3. In some arrangements, the connectors may counteract mutual displacement between the outer shell 2 and the inner shell 3 by absorbing energy. However, this is not essential. Further, even where this feature is present, the amount of energy absorbed is usually minimal in comparison to the energy absorbed by the inner shell 3 during an impact. In other arrangements, connecting members 5 may not be present at all.

Further, the location of these connecting members 5 can be varied (for example, being positioned away from the edge portion, and connecting the outer shell 2 and the inner shell 3 through the sliding layer 4).

The outer shell 2 is preferably relatively thin and strong so as to withstand impact of various types. The outer shell 2 could be made of a polymer material such as polycarbonate (PC), polyvinylchloride (PVC) or acrylonitrile butadiene styrene (ABS) for example. Advantageously, the polymer material can be fibre-reinforced, using materials such as glass-fibre, Aramid, Twaron, carbon-fibre or Kevlar.

The inner shell 3 is considerably thicker and acts as an energy absorbing layer. As such, it is capable of damping or absorbing impacts against the head. It can advantageously be made of foam material like expanded polystyrene (EPS), expanded polypropylene (EPP), expanded polyurethane (EPU), vinyl nitrile foam; or other materials forming a honeycomb-like structure, for example; or strain rate sensitive foams such as marketed under the brand-names Poron™ and D3O™. The construction can be varied in different ways, which emerge below, with, for example, a number of layers of different materials.

Inner shell 3 is designed for absorbing the energy of an impact. Other elements of the helmet 1 will absorb that energy to a limited extent (e.g. the hard outer shell 2 or so-called 'comfort padding' provided within the inner shell 3), but that is not their primary purpose and their contribution to the energy absorption is minimal compared to the energy absorption of the inner shell 3. Indeed, although some other elements such as comfort padding may be made of 'compressible' materials, and as such considered as 'energy absorbing' in other contexts, it is well recognised in the field of helmets that compressible materials are not necessarily 'energy absorbing' in the sense of absorbing a meaningful amount of energy during an impact, for the purposes of reducing the harm to the wearer of the helmet.

A number of different materials and embodiments can be used as the sliding layer 4 or sliding facilitator, for example oil, Teflon, microspheres, air, rubber, polycarbonate (PC), a fabric material such as felt, etc. Such a layer may have a thickness of roughly 0.1-5 mm, but other thicknesses can also be used, depending on the material selected and the performance desired. The number of sliding layers and their positioning can also be varied, and an example of this is discussed below (with reference to FIG. 3B).

As connecting members 5, use can be made of, for example, deformable strips of plastic or metal which are anchored in the outer shell and the inner shell in a suitable manner.

Figure 2:
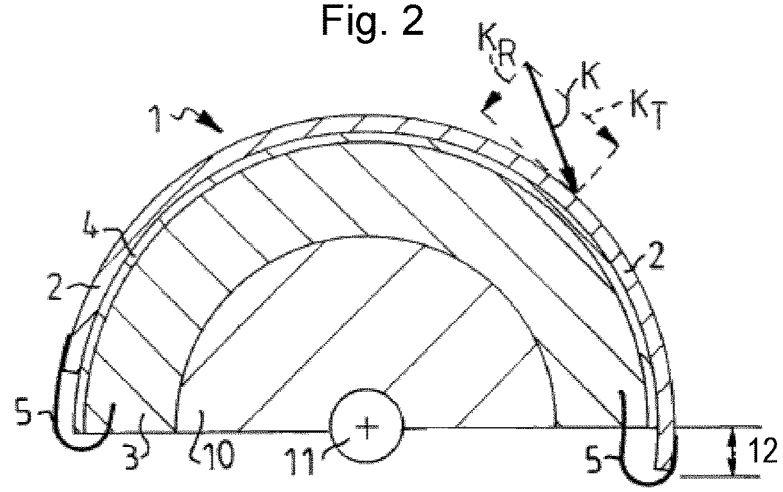
FIG. 2 is a diagram showing the functioning principle of the helmet of FIG. 1.

FIG. 2 shows the functioning principle of protective helmet 1, in which the helmet 1 and a skull 10 of a wearer are assumed to be semi-cylindrical, with the skull 10 being mounted on a longitudinal axis 11. Torsional force and torque are transmitted to the skull 10 when the helmet 1 is subjected to an oblique impact K. The impact force K gives rise to both a tangential force KT and a radial force KR against the protective helmet 1. In this particular context, only the helmet-rotating tangential force KT and its effect are of interest.

As can be seen, the force K gives rise to a displacement 12 of the outer shell 2 relative to the inner shell 3, the connecting members 5 being deformed. Significant reductions in the torsional force transmitted to the skull 10 can be obtained with such an arrangement—a typical reduction may be roughly 25%, though reductions as high as 90% may be possible in some instances. This is a result of the sliding motion between the inner shell 3 and the outer shell 2 reducing the amount of energy which is transferred into radial acceleration.

Sliding motion can also occur in the circumferential direction of the protective helmet 1, although this is not depicted. This can be as a consequence of circumferential angular rotation between the outer shell 2 and the inner shell 3 (i.e. during an impact the outer shell 2 can be rotated by a circumferential angle relative to the inner shell 3).

Figure 3A:
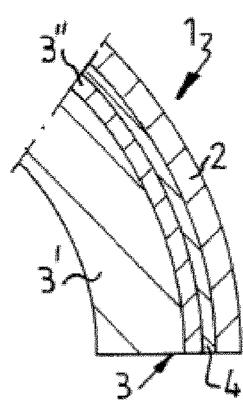
FIGS. 3A, 3B & 3C show variations of the structure of the helmet of FIG. 1.
Figure 3B:
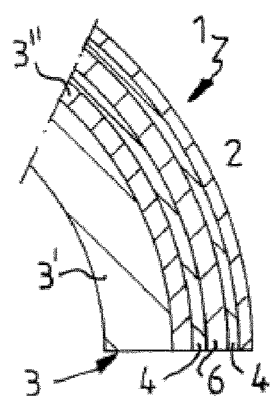
Figure 3C:
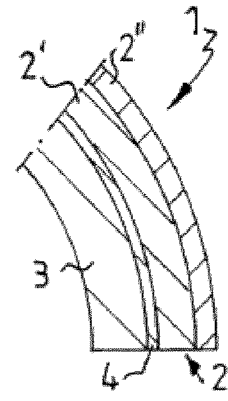

Other arrangements of the protective helmet 1 are also possible. A few possible variants are shown in FIG. 3. In FIG. 3a, the inner shell 3 is constructed from a relatively thin outer layer 3" and a relatively thick inner layer 3'. The outer layer 3" is preferably harder than the inner layer 3', to help facilitate the sliding with respect to outer shell 2. In FIG. 3b, the inner shell 3 is constructed in the same manner as in FIG. 3a. In this case, however, there are two sliding layers 4, between which there is an intermediate shell 6. The two sliding layers 4 can, if so desired, be embodied differently and made of different materials. One possibility, for example, is to have lower friction in the outer sliding layer than in the inner. In FIG. 3c, the outer shell 2 is embodied differently from previously. In this case, a harder outer layer 2" covers a softer inner layer 2'. The inner layer 2' may, for example, be the same material as the inner shell 3.

Figure 4:
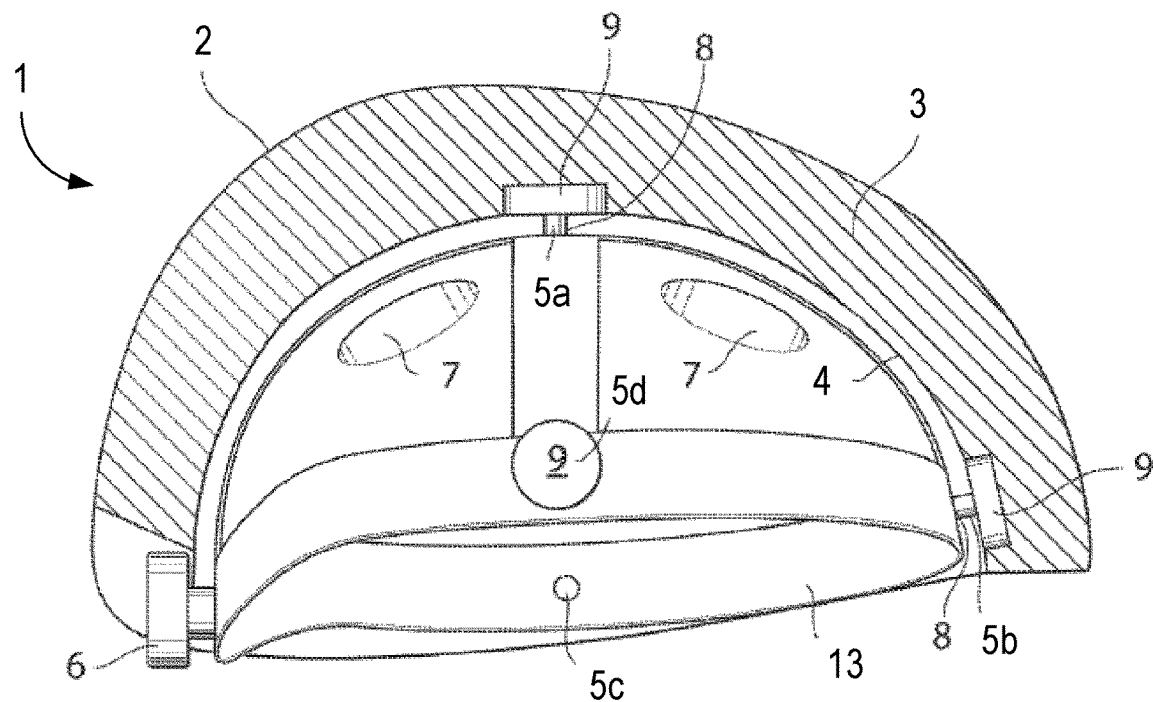
FIGS. 4 and 5 schematically depict another arrangement of a helmet.

FIG. 4 depicts a second helmet 1 of the sort discussed in WO 2011/139224, which is also intended for providing protection against oblique impacts. This type of helmet could also be any of the types of helmet discussed above.

In FIG. 4, helmet 1 comprises an energy absorbing layer 3, similar to the inner shell 3 of the helmet of FIG. 1. The outer surface of the energy absorbing layer 3 may be provided from the same material as the energy absorbing layer 3 (i.e. there may be no additional outer shell), or the outer surface could be a rigid shell 2 (see FIG. 5) equivalent to the outer shell 2 of the helmet shown in FIG. 1. In that case, the rigid shell 2 may be made from a different material than the energy absorbing layer 3. The helmet 1 of FIG. 4 has a plurality of vents 7, which are optional, extending through both the energy absorbing layer 3 and the outer shell 2, thereby allowing airflow through the helmet 1.

An attachment device 13 is provided, for attachment of the helmet 1 to a wearer's head. As previously discussed, this may be desirable when energy absorbing layer 3 and rigid shell 2 cannot be adjusted in size, as it allows for the different size heads to be accommodated by adjusting the size of the attachment device 13. The attachment device 13 could be made of an elastic or semi-elastic polymer material, such as PC, ABS, PVC or PTFE, or a natural fibre material such as cotton cloth. For example, a cap of textile or a net could form the attachment device 13.

Although the attachment device 13 is shown as comprising a headband portion with further strap portions extending from the front, back, left and right sides, the particular configuration of the attachment device 13 can vary according to the configuration of the helmet. In some cases the attachment device may be more like a continuous (shaped) sheet, perhaps with holes or gaps, e.g. corresponding to the positions of vents 7, to allow air-flow through the helmet.

FIG. 4 also depicts an optional adjustment device 6 for adjusting the diameter of the head band of the attachment device 13 for the particular wearer. In other arrangements, the head band could be an elastic head band in which case the adjustment device 6 could be excluded.

A sliding facilitator 4 is provided radially inwards of the energy absorbing layer 3. The sliding facilitator 4 is adapted to slide against the energy absorbing layer or against the attachment device 13 that is provided for attaching the helmet to a wearer's head.

The sliding facilitator 4 is provided to assist sliding of the energy absorbing layer 3 in relation to an attachment device 13, in the same manner as discussed above. The sliding facilitator 4 may be a material having a low coefficient of friction, or may be coated with such a material.

As such, in the FIG. 4 helmet, the sliding facilitator may be provided on or integrated with the innermost side of the energy absorbing layer 3, facing the attachment device 13.

However, it is equally conceivable that the sliding facilitator 4 may be provided on or integrated with the outer surface of the attachment device 13, for the same purpose of providing slidability between the energy absorbing layer 3 and the attachment device 13. That is, in particular arrangements, the attachment device 13 itself can be adapted to act as a sliding facilitator 4 and may comprise a low friction material.

In other words, the sliding facilitator 4 is provided radially inwards of the energy absorbing layer 3. The sliding facilitator can also be provided radially outwards of the attachment device 13.

When the attachment device 13 is formed as a cap or net (as discussed above), sliding facilitators 4 may be provided as patches of low friction material.

The low friction material may be a waxy polymer, such as PTFE, ABS, PVC, PC, Nylon, PFA, FEP, PE and UHMWPE, or a powder material which could be infused with a lubricant. The low friction material could be a fabric material. As discussed, this low friction material could be applied to either one, or both of the sliding facilitator and the energy absorbing layer.

The attachment device 13 can be fixed to the energy absorbing layer 3 and/or the outer shell 2 by means of fixing members 5, such as the four fixing members 5a, 5b, 5c and 5d in FIG. 4. These may be adapted to absorb energy by deforming in an elastic, semi-elastic or plastic way. However, this is not essential. Further, even where this feature is present, the amount of energy absorbed is usually minimal in comparison to the energy absorbed by the energy absorbing layer 3 during an impact.

According to the arrangement shown in FIG. 4 the four fixing members 5a, 5b, 5c and 5d are suspension members 5a, 5b, 5c, 5d, having first and second portions 8, 9, wherein the first portions 8 of the suspension members 5a, 5b, 5c, 5d are adapted to be fixed to the attachment device 13, and the second portions 9 of the suspension members 5a, 5b, 5c, 5d are adapted to be fixed to the energy absorbing layer 3.

Figure 5:
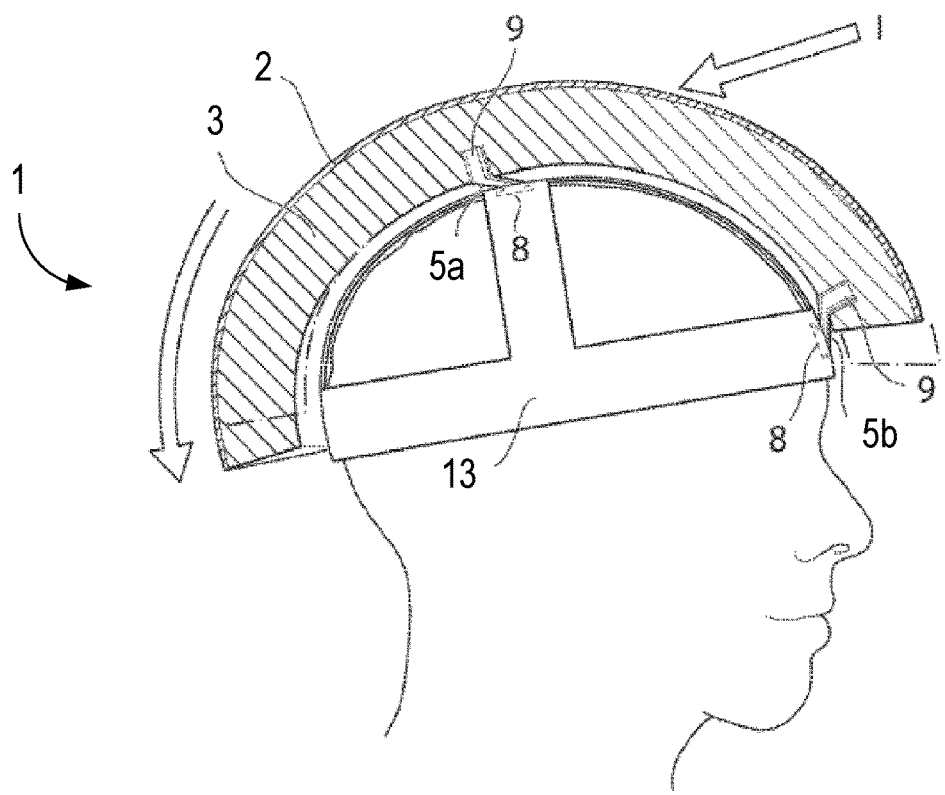

FIG. 5 shows an arrangement of a helmet similar to the helmet in FIG. 4, when placed on a wearer's head. The helmet 1 of FIG. 5 comprises a hard outer shell 2 made from a different material than the energy absorbing layer 3. In contrast to FIG. 4, in FIG. 5 the attachment device 13 is fixed to the energy absorbing layer 3 by means of two fixing members 5a, 5b, which are adapted to absorb energy and forces elastically, semi-elastically or plastically.

A frontal oblique impact I creating a rotational force to the helmet is shown in FIG. 5. The oblique impact I causes the energy absorbing layer 3 to slide in relation to the attachment device 13. The attachment device 13 is fixed to the energy absorbing layer 3 by means of the fixing members 5a, 5b. Although only two such fixing members are shown, for the sake of clarity, in practice many such fixing members may be present. The fixing members 5 can absorb the rotational forces by deforming elastically or semi-elastically. In other arrangements, the deformation may be plastic, even resulting in the severing of one or more of the fixing members 5. In the case of plastic deformation, at least the fixing members 5 will need to be replaced after an impact. In some case a combination of plastic and elastic deformation in the fixing members 5 may occur, i.e. some fixing members 5 rupture, absorbing energy plastically, whilst other fixing members deform and absorb forces elastically.

In general, in the helmets of FIG. 4 and FIG. 5, during an impact the energy absorbing layer 3 acts as an impact absorber by compressing, in the same way as the inner shell of the FIG. 1 helmet. If an outer shell 2 is used, it will help spread out the impact energy over the energy absorbing layer 3. The sliding facilitator 4 will also allow sliding between the attachment device and the energy absorbing layer. This allows for a controlled way to dissipate energy that would otherwise be transmitted as rotational energy to the brain. The energy can be dissipated by friction heat, energy absorbing layer deformation or deformation or displacement of the fixing members. The reduced energy transmission results in reduced rotational acceleration affecting the brain, thus reducing the rotation of the brain within the skull. The risk of rotational injuries including MTBI and STBI such as subdural haematomas, SDH, blood vessel rapturing, concussions and DAI is thereby reduced.

Connectors that may be used within a helmet are described below. It should be appreciated that these connectors may be used in a variety of contexts and are not to be limited to use within helmets. For example, they may be used in other devices that provide impact protection, such as body armour or padding for sports equipment. In the context of helmets, the connectors may, in particular, be used in place of the previously known connecting members and/or fixing members of the arrangements discussed above.

Figure 6:
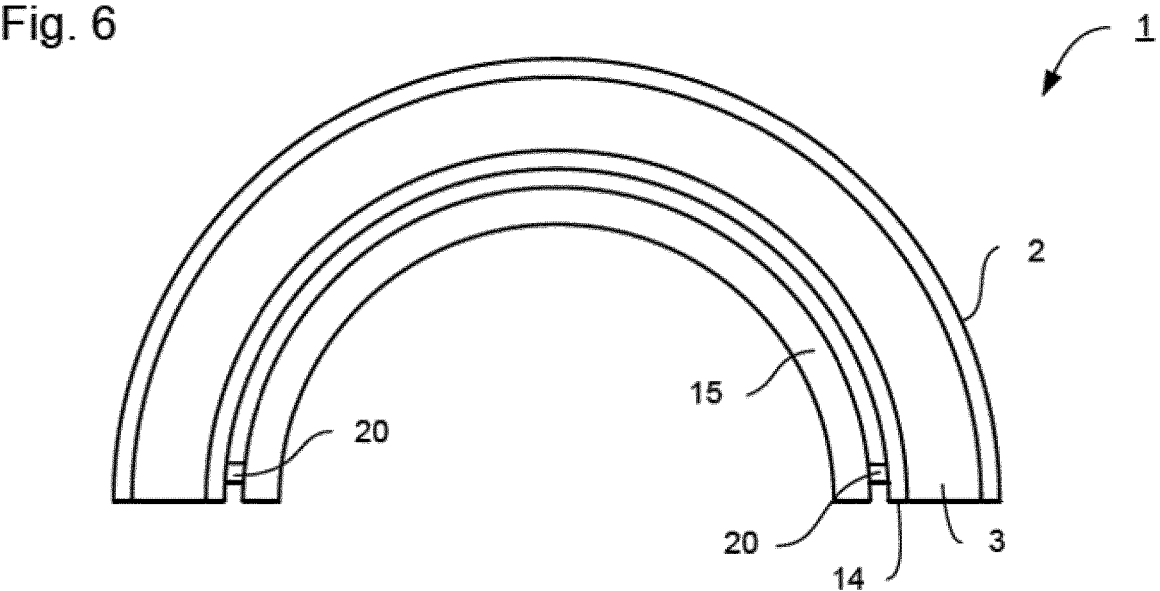
FIGS. 6 to 9 schematically depict further arrangements of helmets.

In an arrangement, the connector may be used with a helmet 1 of the type shown in FIG. 6. The helmet shown in FIG. 6 has a similar configuration to that discussed above in respect of FIGS. 4 and 5. In particular, the helmet has a relatively hard outer shell 2 and an energy absorbing layer 3. A head attachment device is provided in the form of a helmet liner 15. The liner 15 may include comfort padding as discussed above. In general, the liner 15 and/or any comfort padding may not absorb a significant proportion of the energy of an impact in comparison with the energy absorbed by the energy absorbing layer 3.

The liner 15 may be removable. This may enable the liner to be cleaned and/or may enable the provision of liners that are modified to fit a specific wearer.

Between the liner 15 and the energy absorbing layer 3, there is provided an inner shell 14 formed from a relatively hard material, namely a material that is harder than the energy absorbing layer 3. The inner shell 14 may be moulded to the energy absorbing layer 3 and may be made from any of the materials discussed above in connection with the formation of the outer shell 2.

In the arrangement of FIG. 6, a low friction interface is provided between the inner shell 14 and the liner 15. This may be implemented by the appropriate selection of at least one of the material used to form the outer surface of the liner 15 or the material used to form the inner shell 14. Alternatively or additionally, a low friction coating may be applied to at least one of the opposing surfaces of the inner shell 14 and the liner 15. Alternatively or additionally, a lubricant may be applied to at least one of the opposing surfaces of the inner shell 14 and the liner 15.

As shown, the liner 15 may be connected to the remainder of the helmet 1 by way of one or more connectors 20, discussed in further detail below. Selection of the location of the connectors 20 and the number of connectors 20 to use may depend upon the configuration of the remainder of the helmet.

In an arrangement such as shown in FIG. 6, at least one connector 20 may be connected to the inner shell 14. Alternatively or additionally, one or more of the connectors 20 may be connected to another part of the remainder of the helmet 1, such as the energy absorbing layer 3 and/or the outer shell 2. The connectors 20 may also be connected to two or more parts of the remainder of the helmet 1.

Figure 7:
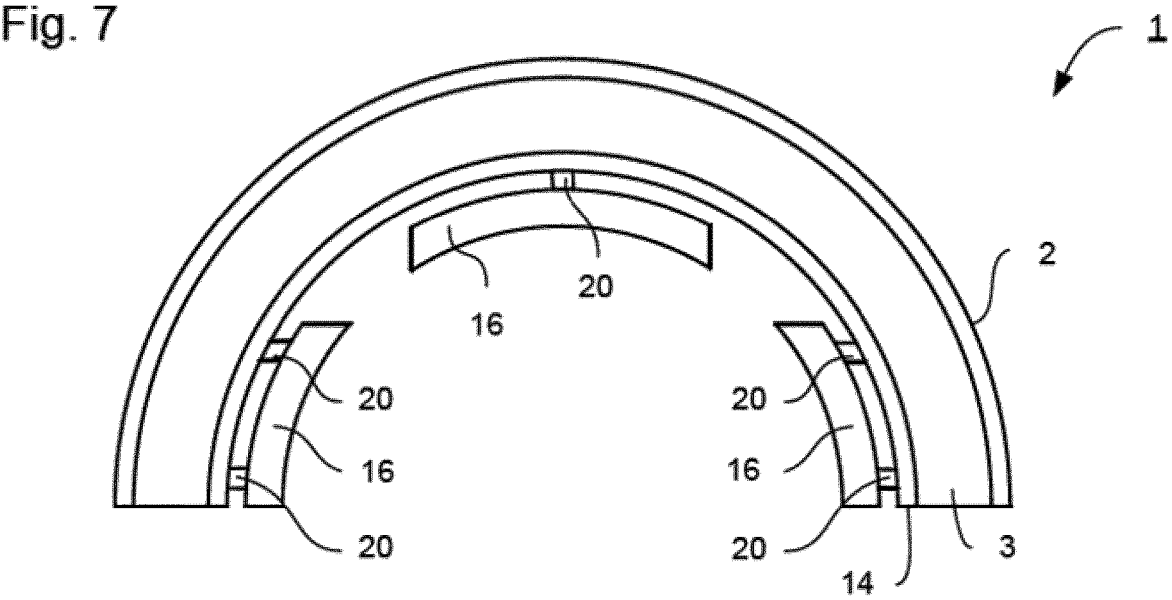

FIG. 7 depicts a further alternative arrangement of a helmet 1. As shown, the helmet 1 of this arrangement includes a plurality of independent sections of comfort padding 16. Each section of comfort padding 16 may be connected to the remainder of the helmet by one or more connectors 20.

The sections of comfort padding 16 may have a sliding interface provided between the sections of comfort padding 16 and the remainder of the helmet 1. In such an arrangement, the sections of comfort padding 16 may provide a similar function to that of the liner 15 of the arrangement shown in FIG. 6. The options discussed above for provision of a sliding interface between a liner and a helmet also apply to the sliding interface between the sections of comfort padding and the helmet.

It should also be appreciated that the arrangement of FIG. 7, namely the provision of a plurality of independently mounted sections of comfort padding 16 provided with a sliding interface between the sections of comfort padding 16 and the remainder of the helmet, may be combined with any form of helmet, including those such as depicted in FIGS. 1 to 5 that also have a sliding interface provided between two other parts of the helmet.

Possible arrangements of connectors 20 will now be described. For convenience, the connectors 20 will be described in the context of a connector for connecting a liner 15 to the remainder of a helmet 1 as depicted in FIG. 6. However, it should be appreciated that the connector 20 may be used for connecting any two parts of an apparatus together. Furthermore, where below the connector 20 is described as having a first component connected to a first part of an apparatus, such as a helmet liner 15, and a second component connected to a second part of an apparatus, such as the remainder of the helmet 1, it should be appreciated that, with suitable modifications, this may be reversed.

Figure 8:
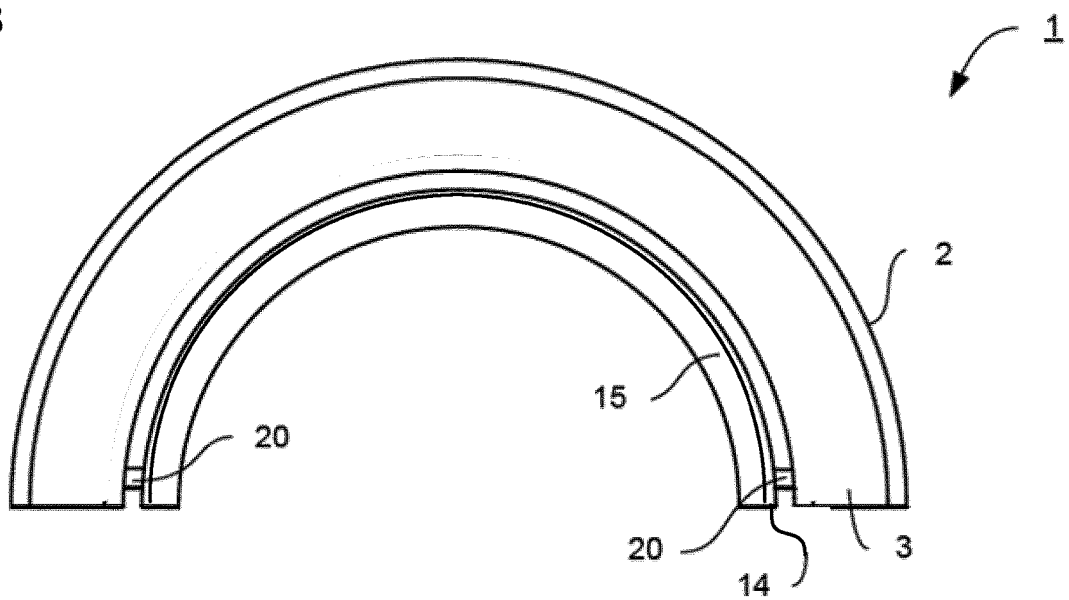
Figure 9:
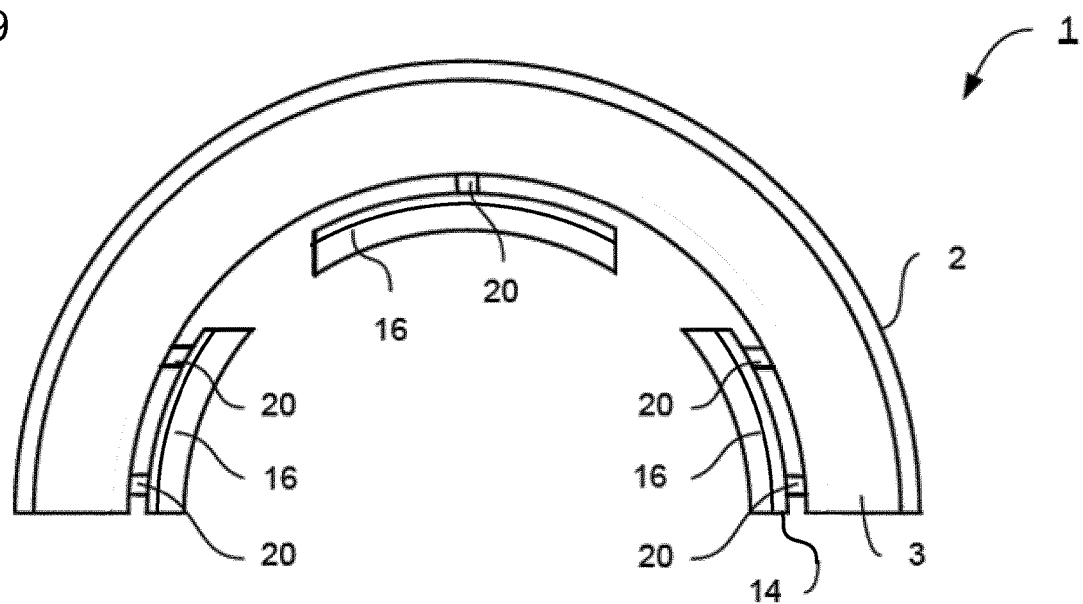

FIGS. 8 and 9 show equivalent arrangements to those of FIGS. 6 and 7, except that the inner shell 14 is applied to the liner 15 (in FIG. 8) or comfort padding 16 (in FIG. 9). In the case of FIG. 9, the inner shell 14 may only be a partial shell or a plurality of sections of shell, as compared to the substantially full shell arrangements of FIGS. 6 to 8. Indeed, in both FIGS. 8 and 9 the inner shell 14 may also be characterised as a relatively hard coating on the liner 15 or comfort padding 16. As for FIGS. 6 and 7, the inner shell 14 is formed from a relatively hard material, namely a material that is harder than the energy absorbing layer 3. For example, the material could be PTFE, ABS, PVC, PC, Nylon, PFA, FEP, PE and UHMWPE. The material may be bonded to the outer side of the liner 15 or comfort padding 16 to simplify the manufacturing process. Such bonding could be through any means, such as by adhesive or by high frequency welding.

In FIGS. 8 and 9 a low friction interface is provided between the inner shell 14 and the energy absorbing layer 3. This may be implemented by the appropriate selection of at least one of the material used to form the outer surface of the energy absorbing layer 3 or the material used to form the inner shell 14. Alternatively or additionally, a low friction coating may be applied to at least one of the opposing surfaces of the inner shell 14 and the energy absorbing layer 3. Alternatively or additionally, a lubricant may be applied to at least one of the opposing surfaces of the inner shell 14 and the energy absorbing layer 3.

In FIGS. 8 and 9, at least one connector 20 may be connected to the inner shell 14. Alternatively or additionally, one or more of the connectors 20 may be connected to another part of the remainder of the liner 15 or comfort padding 16.

Figure 10:
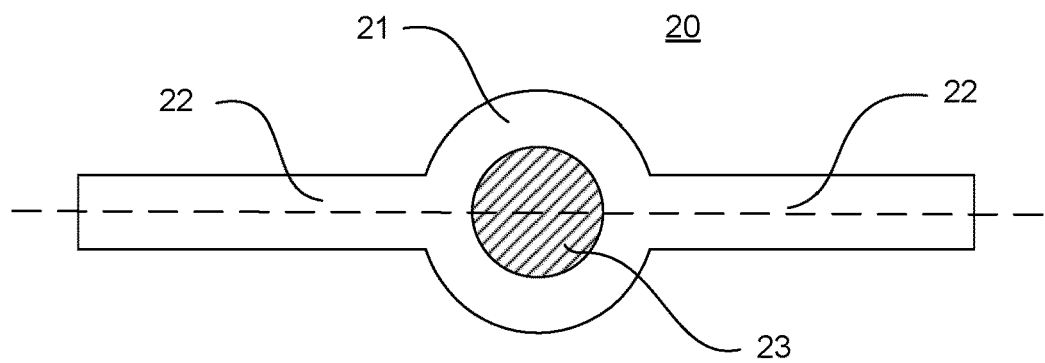
FIG. 10 schematically depicts, a top (plan) view of a connector that may be used in a helmet.
Figure 11:
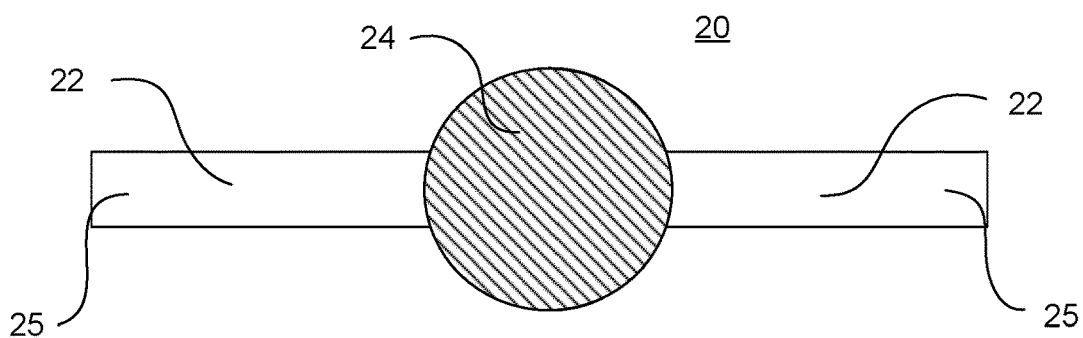
FIG. 11 schematically depicts a bottom (plan) view, of the connector of FIG. 10.
Figure 12:
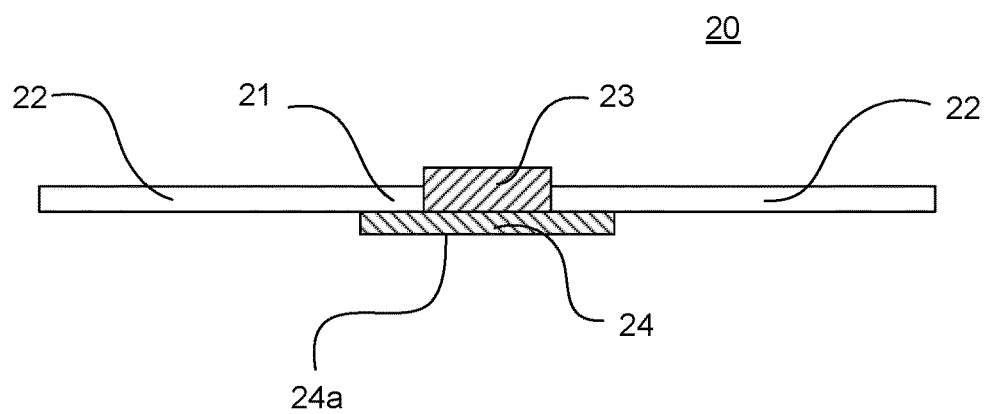
FIG. 12 schematically depicts a cross-sectional side view of the connector of FIG. 10.

FIGS. 10, 11 and 12 respectively depict, a top view, a bottom view and a side view in cross-section (through the dashed lines in FIG. 10), of a connector 20 that may be used to connect first and second parts of an apparatus, such as a helmet. In particular it may be configured to connect a liner 15 or comfort padding 16 to the remainder of a helmet.

In the arrangement depicted in FIG. 10, the connector 20 includes an inner region 21, and two arms 22 extending outward from an edge of the inner region 21. In the arrangement shown in FIGS. 10 and 11, the inner region 21 is substantially circular in shape as viewed from above. However, the inner region 21 is not limited to this shape. Any shape could be used instead, e.g. substantially square or substantially rectangular (with sharp or rounded corners), substantially elliptical or substantially oval.

The inner region 21 comprises an anchor point 23 (referred to as a "first" anchor point) on a first side thereof configured to connect the connector 20 to the first part of the apparatus. The first anchor point 23 is depicted in FIG. 10 in the form of a point at which one side of a hook and loop connector is attached (the other side being on the first part of the apparatus, e.g. a helmet). However, other methods of "detachable" attachment may be used, such as a snap-fit connection or a magnetic connector. Other forms of detachable connection may also be used.

Alternatively, the first anchor point 23 may be used for permanent attachment. For example, the first anchor point 23 may be in the form of a point at which the inner region 21 is attached by high frequency welding to the first part of the apparatus. However, other methods of 'permanent' or non-releasable attachment may be used, such using an adhesive or stitching.

Either type of attachment (detachable or permanent) may be configured such that it prevents translational movement of a first anchor point 23 relative to the part being connected to. However, it may be configured such that the first anchor point 23 and therefore the inner region 21 can rotate about one or more axes of rotation relative to the part being connected to. Alternatively or additionally, the first anchor point 23 may be connected to the parts to be connected by way of one or more additional components.

When viewed in plan view, the first anchor point 23 may be arranged substantially at the centre of the inner region 21. However, this is not essential.

The inner region 21 further comprises a sliding surface 24a on a second side thereof, opposite the first side, the sliding surface 24a being configured to provide a low friction interface between the inner region 21 and an opposing surface of the second part of the apparatus.

Figure 13:
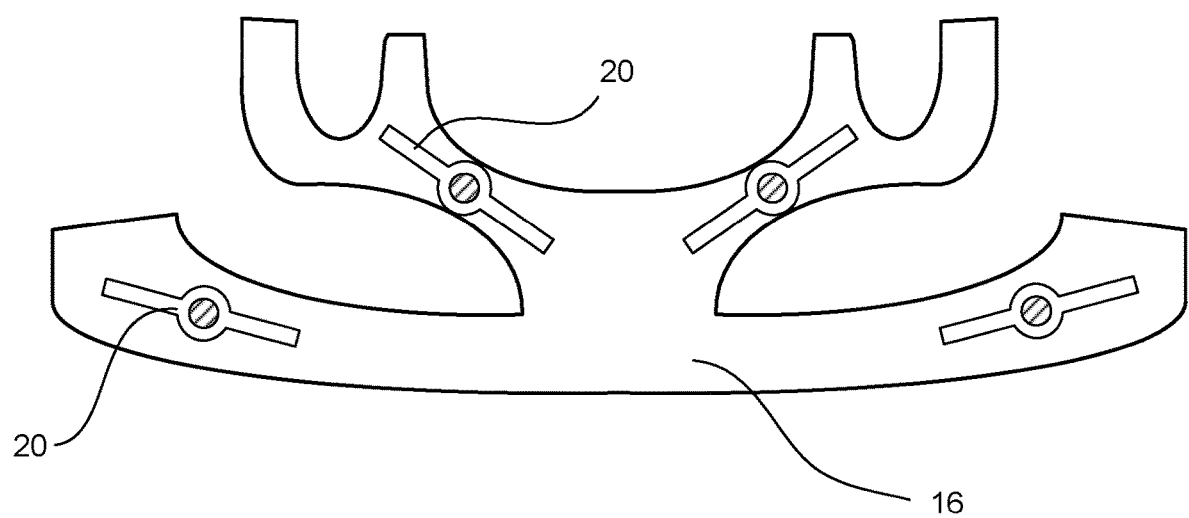
FIG. 13 schematically depicts comfort padding comprising the connectors of FIG. 10.

FIG. 13 shows an example in which a layer of comfort padding 16 comprises a plurality of the connectors 20 depicted in FIGS. 10 to 12. In the arrangement depicted in FIG. 13, the sliding surface 24a of the connector 20 is provided adjacent to the surface of the second part, in this case the comfort padding layer 16, such that the sliding surface 24a may slide on the surface of the comfort padding layer 16 (e.g. translationally and/or rotationally with respect to a neutral position of the inner region 21).

In order to ensure that the sliding surface 24a can slide relative to the surface of the second part of the apparatus, a low friction interface may be provided between the opposing surfaces of the sliding surface 24a and the second part of the apparatus.

In this context, a low friction interface may be configured such that sliding contact is still possible even under the loading that may be expected in use. In the context of a helmet, for example, it may be desirable for sliding to be maintained in the event of an impact that is expected to be survivable for the wearer of a helmet. This may be provided, for example, by the provision of an interface between the two surfaces at which the coefficient of friction is between 0.001 and 0.3 and/or below 0.15.

A low friction interface may be implemented by at least one of using at least one low friction material for the construction of the element forming at least one of the opposing surfaces of the sliding surface and the surface of the second part of the apparatus, applying a low friction coating to at least one of the opposing surfaces, applying a lubricant to at least one of the opposing surfaces, and providing an unsecured additional layer of material between the opposing surfaces that has at least one low friction surface.

In the arrangement shown in FIGS. 10 to 12, the inner region 21 comprises a portion of deformable material integrally formed with the arms 22 and a plate 24 of relatively stiff material compared to the deformable material. The plate 24 may be formed from a sufficiently stiff material that the plate 24 (and therefore, at least part of the inner region 21) substantially retains its shape during expected use of the apparatus. In the context of a helmet, this may include normal handling of the helmet and wearing the helmet under normal conditions. It may also include conditions including an impact on the helmet for which the helmet is designed with the expectation that the impact would be survivable for the wearer of the helmet.

The plate 24 may be made from a variety of different materials. In an example, the plate 24 may be made from polycarbonate (PC), polyvinylchloride (PVC), acrylonitrile butadiene styrene (ABS), polypropylene (PP), Nylon or another plastic. The plate may optionally have a thickness in the range of from approximately 0.2 mm to approximately 1.5 mm, for example approximately 0.7 mm thick.

The plate 24 may be substantially the same shape as the inner region as viewed in plan view. The deformable material of the inner region 21 may partially cover the plate 24 on one side. In the arrangement shown in FIGS. 10 to 12, the deformable material of the inner region 21 is ring shaped (annular) so as to cover one side of the periphery of the circular plate 24. The ring shape defines a circular through-hole in the deformable material. This through-hole allows the anchor point 23 to be directly connected to the plate 24, as shown in FIG. 12.

Other arrangements may be possible, however. For example, the deformable material may completely cover one side of the plate 24 (i.e. no through-hole is provided), in which case the anchor point 23 may be connected to the deformable material. Further, the deformable material of the inner region 21 may at least partially cover two opposing sides of the plate 24.

The plate 24 may be fixed to the deformable material by an adhesive, for example. Alternatively, the plate 24 may be co-moulded with the deformable material of the inner region 21. However, in some arrangements, the plate 24 may not be fixed to the deformable material. For example, with reference to FIG. 12, the anchor point 23 may be wider than the through-hole in the deformable material (or provided on a second plate wider than the through-hole) and located on the other side of the deformable material to the plate 24. The anchor point 23 and the plate 24 may be connected via the through-hole so as to sandwich the deformable material therebetween.

The arms 22 of the connector 20 are formed from a deformable material and configured to connect the connector 20 to the second part of the apparatus. In the arrangement of FIGS. 10 to 12, the arms 22 extend from mutually opposite sides of the inner region 21. However, other arrangements are possible instead. Further, the connector 20 is not limited to having two arms 22. For example, three, four, or more arms 22 may be provided. The arms may be arranged symmetrically, for example, (e.g. at regular intervals around the edge of the inner region 21).

As shown in FIGS. 10 to 12, each arm 22 may extend in a direction substantially parallel to the sliding surface 24a of the inner region 21. However, other arrangements may be possible. For example, the arms 22 may extend at an angle to the siding surface 24a of the inner region 21. In that case, the arms 22 may extend in away from the inner region 21 towards the side of the connector 20 on which the anchor point 23 is provided or towards a side of the connector 20 on which the sliding surface 24a is provided.

In the arrangement shown in FIGS. 10 to 12, each arm 22 may further comprise an anchor point 25 (referred to as a "second" anchor point to distinguish from the first anchor point 23 of the inner region 21) for connecting the arm 22 to the second part of the apparatus. The second anchor point 25 may be located at a distal end of each arm 22, as indicated in FIG. 11.

The second anchor point 25 may be used for permanent attachment. For example, the anchor point 25 may be in the form of a point at which the arms 22 are attached by adhesive to the first part of the apparatus. The arms 22 may include a groove or ridge running substantially perpendicular to the extension direction of the arms 22 to provide a barrier to prevent adhesive spreading from the distal end of the arms 22 towards the inner region. Other methods of 'permanent' or non-releasable attachment may alternatively be used, such as using high frequency welding or stitching.

Alternatively, the second anchor point 25 may be in the form of a detachable anchor point, e.g. point at which one side of a hook and loop connector is attached (the other side being on the second part of the apparatus). However, other methods of 'detachable' attachment may be used, such as a snap-fit connection or a magnetic connector.

FIG. 13 depicts a comfort padding layer 16 comprising a plurality of the connectors 20 depicted in FIGS. 10 to 12. Although the comfort padding layer 16 is shown as being flat, i.e. in the plane of the page, when the layer 16 is positioned within the rest of the helmet, the comfort padding layer 16 bends to conform to the concave shape of the inner surface of the rest of the helmet.

The arms 22 of the connectors 20 are configured to be connected to surface of the second part of the apparatus forming the sliding interface with the sliding surface of the inner region 21, so as to be substantially parallel with said surface of the second part of the apparatus, as shown in FIG. 13. However, other arrangements are possible. For example, the arms 22 may be arranged to wrap around a portion of the second part of the apparatus and attach to a surface of the second part of the apparatus opposite the surface forming the sliding interface. This arrangement is similar to that described below in relation to FIG. 17.

When attached to the second part of the apparatus, the arms 22, formed from the deformable material, are configured to bias the inner region 21 towards a first position, such that when the inner region 21 is displaced away from the first position (e.g. by sliding along a low friction interface) the arms 22 of deformable material urge the inner region 21 back into the first position.

As the sliding surface 24a of the connector 20 slides over the surface of the second part of apparatus (e.g. during an impact), the inner region 21 moves relative to the surface of the second part of the apparatus and deforms the arms 22. As such, the arms 22 define a (neutral) natural resting position of the inner region 21 relative to the first and second parts of the surrounding apparatus to which they connect via the anchor points 23, 25. However, by deformation of the deformable material 23 during displacement of the inner region 21, for example stretching of one side of the deformable material, the inner region 21 is permitted to slide. In doing so, the first part of the apparatus, such as the remainder of the helmet, which may be connected to the first anchor point 23, may slide relative to the first part of the apparatus, such as the liner 15, connected to the second anchor point 25.

A connector 20 may be configured to permit a desired relative range of movement of the inner region 21, and therefore the relative range of movement between the first part of the apparatus the second part of the apparatus being connected. Such configuration may be achieved by the selection of the material forming the arms 22, the thickness of the material forming the arms 22 and the number and location of the arms 22. For example, a connector 20 for use within a helmet may be configured to enable a relative movement of the inner region 21 to the surface of the second part of the apparatus of approximately 5 mm or more in any direction within a plane parallel to the sliding surface of the inner region 21.

The arms 22 can be formed of material that deforms substantially elastically for the required range of movement of the inner region 21 relative to the second part of the apparatus. For example, the deformable material may be formed from at least one of an elasticated fabric, an elasticated cloth, an elasticated textile and an elastomeric material, e.g. a elastomeric polymeric material such as silicone/polysiloxane.

The deformable material may be formed as a single piece, by moulding for example, or may be formed by connecting together multiple pieces, e.g. an upper layer and a lower layer, subsequently joined.

Figure 14:
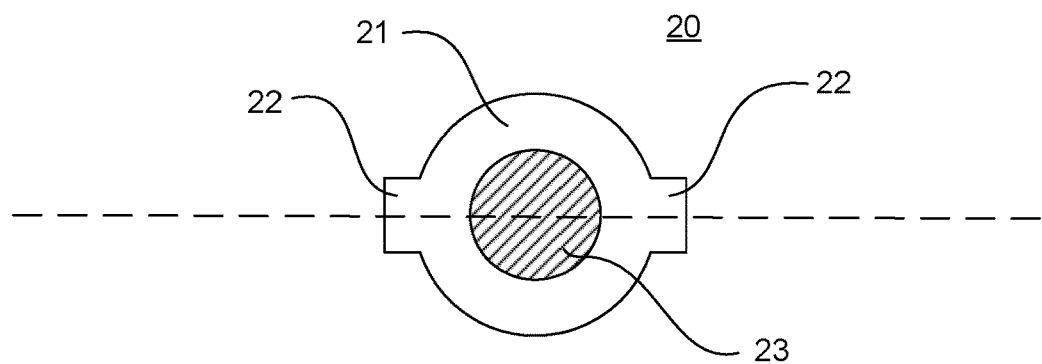
FIG. 14 schematically depicts a top (plan) view of another connector that may be used in a helmet.
Figure 15:
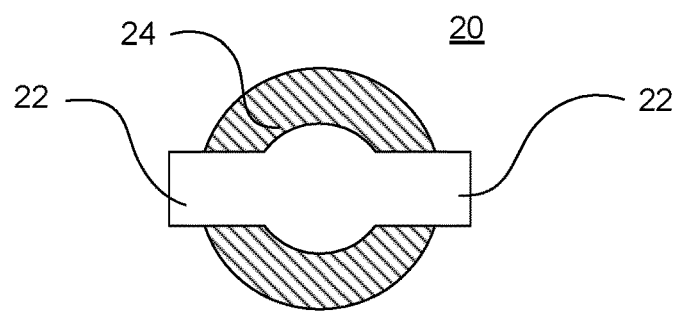
FIG. 15 schematically depicts a bottom (plan) view, of the connector of FIG. 14
Figure 16:
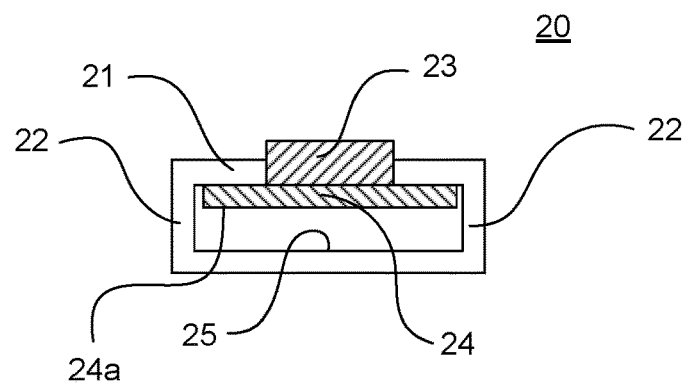
FIG. 16 schematically depicts a cross-sectional side view of the connector of FIG. 14.

FIGS. 14, 15 and 16 respectively depict, a top view, a bottom view and a side view in cross-section (through the dashed lines in FIG. 14), of a further arrangement of a connector 20 that may be used to connect first and second parts of an apparatus, such as a helmet. In particular it may be configured to connect a liner 15 or comfort padding 16 to the remainder of a helmet.

In the arrangement depicted in FIG. 14, the connector 20 includes an inner region 21, and two arms 22 extending outward from an edge of the inner region 21. The inner region 21 may be the same as the inner region 21 of the connector depicted in FIGS. 10 to 12. However, the arms 22 are different to the arms of that arrangement. Therefore, only the arms 22 will be described in detail below.

Similarly to the previous arrangement, the arms 22 of the connector 20 are formed from a deformable material and configured to connect the connector 20 to the second part of the apparatus. In the arrangement of FIGS. 14 to 16, the arms extend from mutually opposite sides of the inner region 21. However, other arrangements are possible instead. Further, the connector 20 is not limited to having two arms 22. For example, four, or more arms 22 may be provided. The arms, may be arranged symmetrically, for example, e.g. at regular intervals around the edge of the inner region 21.

As shown in FIGS. 14 to 16, each arm 22 extends away from the first anchor point and joins with the other arm 22 to form a closed loop on the opposite side of the inner region 21 to the first anchor point 23. The closed loop is configured to loop around a portion of the second part of the apparatus. The loop may be formed from a plurality of substantially straight sections, the sections being angled with respect to each other (e.g. as shown in FIG. 16) and/or may be formed from one or more curved sections.

In the arrangement shown in FIGS. 14 to 16, the arms 22 may further comprise an anchor point 25 (referred to as a "second" anchor point to distinguish from the first anchor point 23 of the inner region) for connecting the arms 22 to the second part of the apparatus. The connector 20 may have only one second anchor point 25.

The second anchor point 25 may be arranged on the loop formed by the arms 22 at a location opposite and facing the inner region 21 and may be configured to connect to a surface of the second part of the apparatus opposite the surface forming the sliding interface. In other words, the connector 20 may be attached to the inside of the second part of the apparatus, the sliding interface being provided on the outside of the second part of the apparatus. As shown in FIG. 15, the arms 22 may comprise a relative wide portion at the location of the second anchor point to allow for a larger anchor point 25. This relatively wide portion may be substantially circular in shape, for example, as shown in FIG. 15.

The second anchor point 25 may be used for permanent attachment. For example, the anchor point 25 may be in the form of a point at which the arms 22 are attached by adhesive to the first part of the apparatus. The arms 22 may include grooves or ridges running substantially perpendicular to the extension direction of the arms 22 to provide a barrier to prevent adhesive spreading from the second anchor point 25 towards the inner region 21. Other methods of 'permanent' or non-releasable attachment may alternatively be used, such as using high frequency welding or stitching.

Alternatively, the second anchor point 25 may be in the form of a detachable anchor point, e.g. point at which one side of a hook and loop connector is attached (the other side being on the second part of the apparatus). However, other methods of 'detachable' attachment may be used, such as a snap-fit connection or a magnetic connector.

Figure 17:
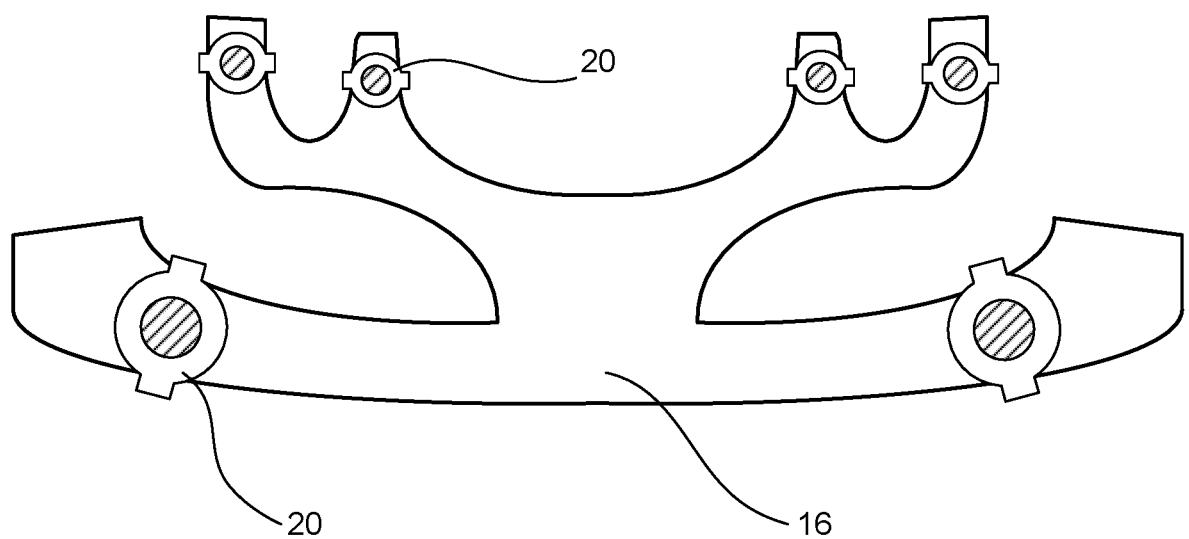
FIG. 17 schematically depicts comfort padding comprising the connectors of FIG. 14.

FIG. 17 depicts a comfort padding layer 16 comprising a plurality of the connectors 20 depicted in FIGS. 14 to 16. Although the comfort padding layer 16 is shown as being flat, i.e. in the plane of the page, when the layer 16 is positioned within the rest of the helmet, the layer 16 bends to conform to the concave shape of the inner surface of the rest of the helmet.

When attached to the second part of the apparatus, the arms 22, formed from the deformable material, are configured to bias the inner region 21 towards a first position, such that when the inner region 21 is displaced away from the first position (e.g. by sliding along a low friction interface) the arms 22 of deformable material urge the inner region 21 back into the first position.

As the sliding surface 24a of the connector 20 slides over the surface of the second part of apparatus (e.g. during an impact), the inner region 21 moves relative to the surface of the second part of the apparatus and deforms the arms 22. As such, the arms 22 define a (neutral) natural resting position of the inner region 21 relative to the first and second parts of the surrounding apparatus to which they connect via the anchor points 23, 25. However, by deformation of the deformable material during displacement of the inner region 21, for example stretching of one side of the deformable material, the inner region 21 is permitted to slide. In doing so, the first part of the apparatus, such as the remainder of the helmet, which may be connected to the first anchor point 23, may slide relative to the first part of the apparatus, such as the liner 15, connected to the second anchor point 25.

A connector 20 may be configured to permit a desired relative range of movement of the inner region 21, and therefore the relative range of movement between the first part of the apparatus the second part of the apparatus being connected. Such configuration may be achieved by the selection of the material forming the arms 22, the thickness of the material forming the arms 22 and the number and location of the arms 22. For example, a connector 20 for use within a helmet may be configured to enable a relative movement of the inner region 21 to the surface of the second part of the apparatus of approximately 5 mm or more in any direction within a plane parallel to the sliding surface of the inner region 21.

The arms 22 can be formed of material that deforms substantially elastically for the required range of movement of the inner region 21 relative to the second part of the apparatus. For example, the deformable material may be formed from at least one of an elasticated fabric, an elasticated cloth, an elasticated textile and an elastomeric material, e.g. a elastomeric polymeric material such as silicone/polysiloxane.

The deformable material may be formed as a single piece, by moulding for example, or may be formed by connecting together multiple pieces, e.g. an upper layer and a lower layer, subsequently joined.

Figure 18:
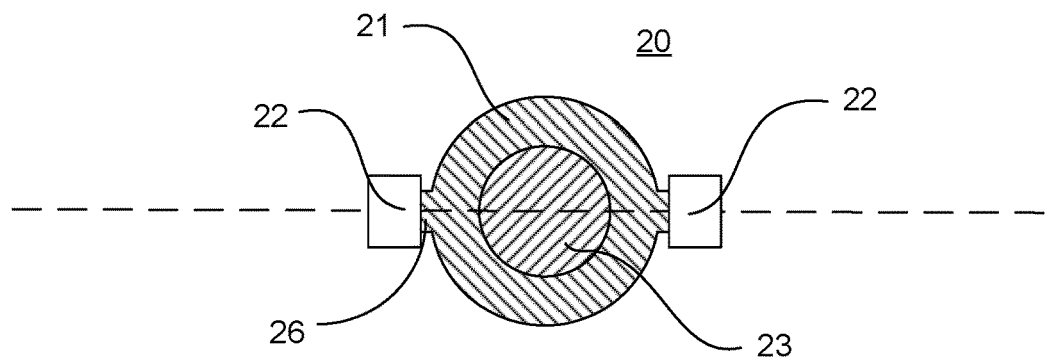
FIG. 18 schematically depicts a top (plan) view of another connector that may be used in a helmet.
Figure 19:
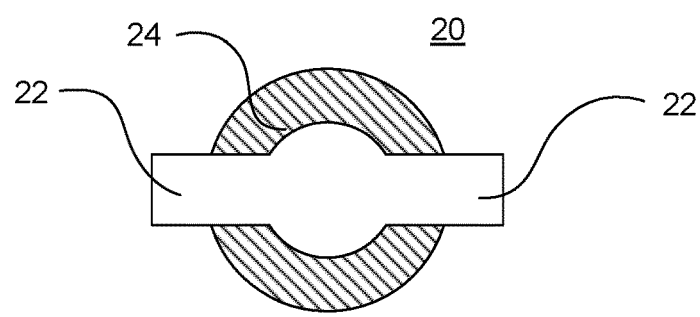
FIG. 19 schematically depicts a bottom (plan) view, of the connector of FIG. 18.
Figure 20:
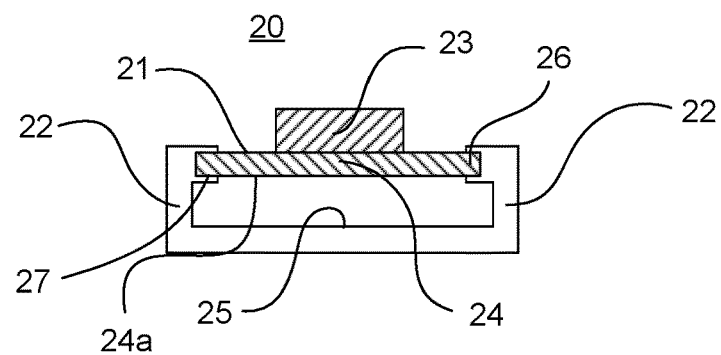
FIG. 20 schematically depicts a cross-sectional side view of the connectors of FIG. 18.

FIGS. 18, 19 and 20 respectively depict, a top view, a bottom view and a side view in cross-section (through the dashed lines in FIG. 18), of a further arrangement of a connector 20 that may be used to connect first and second parts of an apparatus, such as a helmet. In particular it may be configured to connect a liner 15 or comfort padding 16 to the remainder of a helmet.

In the arrangement depicted in FIG. 18, the connector 20 includes an inner region 21, and two arms 22 extending outward from an edge of the inner region 21. The arms 22 may be substantially the same as the arms 22 of the arrangement depicted in FIGS. 14 to 16 and only the differences between the arrangements will be discussed below.

In the arrangement shown in FIGS. 18 and 19, the inner region 21 is substantially circular in shape as viewed from above. However, the inner region 21 is not limited to this shape. Any shape could be used instead, e.g. substantially square or substantially rectangular (with sharp or rounded corners), substantially elliptical or substantially oval.

The inner region 21 comprises a first anchor point 23 on a first side thereof configured to connect the connector 20 to the first part of the apparatus. The first anchor point 23 is the same as described previously in relation to FIGS. 10 to 12 and 14 to 16.

The inner region 21 further comprises a sliding surface 24a on a second side thereof, opposite the first side, the sliding surface 24a being configured to provide a low friction interface between the inner region 21 and an opposing surface of the second part of the apparatus. The sliding surface 24a is the same as described previously in relation to FIGS. 10 to 12 and 14 to 16.

The inner region 21 of the arrangement shown in FIGS. 18 to 20 differs from the inner region 21 of the arrangement shown in FIGS. 10 to 12 and 14 to 16 in that the inner region 21 does not comprise a portion of deformable material integrally formed with the arms 22. Instead, the inner region 21 comprises a plate 24 of relatively stiff material compared to the deformable material, connected to the arms 22.

In the arrangement shown in FIGS. 18 to 20, the plate 24 comprises protrusions 26 extending from an edge of the inner region 21 (parallel to the plate 24) and the plate 24 is connected to the arms 22 via the protrusions 26. The plate 24 may otherwise be the same as described in relation to the arrangements shown in FIGS. 10 to 12 and 14 to 16.

The deformable material of the arms 22 may at least partially cover two opposing sides of the protrusions 26. In the arrangement shown in FIGS. 18 to 20, the deformable material of the arms 22 forms a slot 27, surrounded on all sides by the deformable material, into which the protrusions 26 are inserted. Other arrangements may be possible, however. For example, the deformable material of the arms 22 may at least partially cover the protrusions 26 only on one side.

The protrusions 26 may be fixed to the deformable material of the arms 22 by an adhesive, for example, as depicted in FIG. 12. Alternatively, the protrusions 26 may be co-moulded with the deformable material of the arms 22

In yet a further arrangement, not shown in the Figures, the inner region 21 of the arrangement shown in FIGS. 18 to 20 may be combined with the arms 22 of the arrangement shown in FIGS. 10 to 12, i.e. arms extending away from the inner region 21 but not forming a closed loop.

Although in each of the specific arrangements described above the inner region comprises a relatively stiff plate 24 which provides the sliding surface 24a, alternative arrangements are possible. For example, the sliding surface 24a may be provided by a flexible material, such as a layer of fabric (woven or nonwoven). The flexible material may be exchanged, like-for-like, with the plate 24 in any of the above described arrangements. In such arrangements, the flexible material would not be provided on the surface of the arms 22. However, the flexible material may additionally be provided on the surface of the arms 22 facing the second part of the apparatus, e.g. as one continuous layer. Accordingly, the sliding interface may not only be provided between the inner region 21 and the surface of the second part of the apparatus, but also between the surface of the arms 22 and the surface of the second part of the apparatus.

The connectors 20 may be used in combination with a different type of connector to connect the first and second parts of the apparatus. For example, the connectors 20 may be used in combination with the connectors described in WO 2017/157765 or GB 1719559.5 (or the PCT application claiming priority from GB 1719559.5, namely WO 2019101816), which are herein incorporated in their entirety by reference.

As discussed above, within a helmet a sliding interface may be provided between two components of a helmet, such as between two layers or shells of a helmet and/or between two parts of a connector provided between two layers or shells of a helmet. In the context of the present invention, the term sliding interface is intended to refer to a low friction (sliding) interface. Such a sliding interface may be provided by forming at least one of the components from materials selected such that there is low friction when their surfaces are in contact, namely at the sliding surfaces. The components need not be formed from the same material.

It has been found that the performance of the sliding interface may be enhanced when (at least) one of the components (e.g. the first component) comprises a polyketone. It should be appreciated that any of the sliding interfaces discussed above may comprise such a polyketone.

Thus, the present invention provides a helmet, comprising first and second components having a sliding interface between them, wherein the sliding interface is provided between respective sliding surfaces of the first and second components, and the first component comprises a polyketone; and for the avoidance of doubt (since the term sliding interface is intended to refer to a low friction (sliding) interface between the surfaces of two components of a helmet), it may also be described as providing a helmet, comprising first and second components having a sliding interface between them, wherein the sliding interface is provided between respective sliding surfaces of the first and second components which are in contact, and the first component comprises a polyketone, and also as providing a helmet, comprising first and second components having a sliding interface between them, wherein the sliding interface is provided between respective solid sliding surfaces of the first and second components which are in contact, and the first component comprises a polyketone.

Preferably the polyketone comprises carbonyl units plus straight or branched alkylene units having 2 to 6 carbon atoms, i.e. they may be ethylene, propylene, butylene, pentylene and/or hexylene. More preferably the straight or branched alkylene units have 2 to 5 carbon atoms, more preferably still 2 to 4 carbon atoms, and most preferably 2 or 3 carbon atoms (i.e. most preferably they are ethylene and/or propylene). Typically the straight or branched alkylene units are a mixture of ethylene units plus units of one or more (other) alkylene groups having 3 to 6 carbon atoms, more preferably 3 to 5 carbon atoms, more preferably 3 or 4 carbon atoms, and most preferably 3 carbon atoms—i.e. preferably the straight or branched alkylene units comprise a mixture of ethylene and propylene units.

Preferably the straight or branched alkylene units are derived or derivable from one or more alkenes, and typically they are derived or derivable from one or more alkenes selected from alkenes having 2 to 6 carbon atoms, such as ethene, propene, 1-butene, cis-2-butene, trans-2-butene, isobutylene, 1-pentene, cis-2-pentene, trans-2-pentene, 2-methylbut-1-ene, 3-methylbut-1-ene (isopentene), 2-methylbut-2-ene (isoamylene), 1-hexene, cis-2-hexene, trans-2-hexene, cis-3-hexene, trans-3-hexene, 2-methyl-1-pentene, 2-ethyl-1-butene, cis 3-methyl-2-pentene, trans 3-methyl-2-pentene, and 2,3-dimethyl-2-butene. More preferably they are derived or derivable from one or more alkenes selected from alkenes having 2 to 5 carbon atoms, more preferably still 2 to 4 carbon atoms, and more preferably still 2 or 3 carbon atoms (i.e. ethene and/or propene). Typically they are derived from a mixture of ethene and propene.

Preferably the straight or branched alkylene units are derived or derivable from one or more alpha olefins, i.e. alkenes having a double bond at the primary (or alpha) position. Preferably the straight or branched alkylene units are derived or derivable from one or more alpha olefins having 2 to 6 carbon atoms (i.e. ethene, propene, 1-butene, 1-pentene, and/or 1-hexene), more preferably 2 to 5 carbon atoms, more preferably still 2 to 4 carbon atoms, and most preferably 2 or 3 carbon atoms—i.e. most preferably the straight or branched alkylene units are derived or derivable from ethene and/or propene. Typically the polyketone comprises carbonyl units plus units derived or derivable from both (a) ethene, and (b) an alpha olefin having 3 to 6 carbon atoms, more preferably 3 to 5 carbon atoms, more preferably still 3 or 4 carbon atoms, and most preferably 3 carbon atoms. Thus, in a particularly preferred aspect, the polyketone comprises carbonyl units plus units derived or derivable from both ethene and propene.

It is possible to incorporate other units in the polyketone (e.g. besides the carbonyl and straight or branched $C_{2-6}$alkylene units), provided that they do not interfere with the performance of the sliding interface. For instance, in some cases it may be possible to include longer alkylene units (e.g. units containing more than 6 carbon atoms), substituted alkylene units wherein the substituents are moieties which do not interfere with the performance of the sliding interface, and/or inert spacer groups. Typically such other units would be present only in minor amounts, though, and the carbonyl units plus straight or branched alkylene units account for the majority of the polyketone. Preferably they account for at least 80% by weight of the polyketone, more preferably at least 90% by weight, such as at least 95%, at least 98%, or at least 99% by weight. Typically the carbonyl and straight or branched alkylene units account for substantially all of the polyketone, e.g. at least 99.9% by weight, at least 99.99% by weight, or at least 99.999% by weight.

Preferably the polyketone consists essentially of alternating carbonyl and alkylene units. It is possible for defects to be present, such as multiple (typically double) olefin insertions and/or multiple (typically double) carbonyl insertions. However, commercial polyketone syntheses routinely yield products having a relatively low number of such defects, and so polyketones having low levels of defects are available. Thus, typically the average number of multiple (e.g. double) olefin insertions per molecule represents ≤0.1% of the average number of olefin units per molecule, more typically ≤0.01%, such as ≤0.001%, ≤0.0005% or even ≤0.0001%. The average number of multiple (e.g. double) carbonyl insertions per molecule typically represents ≤0.1% of the average number of olefin units per molecule, more typically ≤0.01%, such as ≤0.001%, ≤0.0005% or even ≤0.0001%.

Although the polyketone typically has a high level of order in terms of the alternation between the carbonyl and alkylene units, when it comes to nature of the alkylene group from one unit to the next, there is typically little or no order. Thus, in the preferred embodiments wherein the polyketone comprises carbonyl units plus units of both ethylene and one or more $C_{3-6}$alkylene groups (typically propylene), there is no particular limitation as regards the distribution of the ethylene and the $C_{3-6}$alkylene (e.g. propylene) units. The polyketone may have a block type structure as regards the distribution of ethylene and $C_{3-6}$alkylene (e.g. propylene) units. More typically, though, the ethylene and $C_{3-6}$alkylene (e.g. propylene) units are distributed randomly within each molecule (subject to the point that the polyketone typically has a high level of order in terms of the alternation between the carbonyl and alkylene units).

Preferably the polyketone is semi-crystalline.

The polyketone is preferably of formula (I):

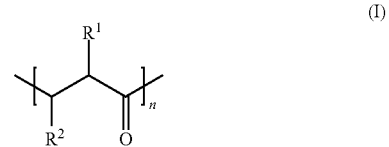

wherein:
each $R^1$ is independently H or $C_{1-4}$alkyl;
each $R^2$ is independently H or $C_{1-4}$alkyl; and
n is from 100 to 10,000;
subject to the proviso that the total number of carbon atoms in each unit (i.e. including the carbon atoms in $R^1$ and $R^2$, the carbon atoms to which $R^1$ and $R^2$ are attached, and the carbon atom in the carbonyl moiety) does not exceed 7.

Preferably each $R^1$ is independently H or $C_{1-3}$alkyl, more preferably each $R^1$ is independently H, methyl or ethyl, and more preferably still each $R^1$ is independently H or methyl.

Preferably each $R^2$ is independently H or $C_{1-3}$alkyl, more preferably each $R^2$ is independently H, methyl or ethyl, and more preferably still each $R^2$ is independently H or methyl.

Preferably the total number of carbon atoms in each unit does not exceed 6, more preferably it does not exceed 5, and more preferably still it does not exceed 4. Typically, the total number of carbon atoms in each unit is independently either 3 or 4.

Preferably n is at least 300, more preferably at least 500, more preferably still at least 700, and more preferably still at least 800.

Preferably n is no more than 8000, more preferably no more than 6000, more preferably still no more than 4000, more preferably still no more than 3000, and more preferably still no more than 2000.

Preferred ranges for n are 500 to 4000, 700 to 3000, and 800 to 2000. In some cases, it can be useful to work at relatively low values for n, such as values in the region of 700 to 1200, or 800 to 1000. Working at these lower ranges can facilitate processing steps such as injection moulding, as the polyketone then tends to have a higher melt flow index.

In a particularly preferred embodiment, at least one of $R^1$ and $R^2$ is H and the other is either H or $C_{1-4}$alkyl. More preferably, at least one of $R^1$ and $R^2$ is H and the other is either H or $C_{1-3}$alkyl. More preferably still, at least one of $R^1$ and $R^2$ is H and the other is either H, methyl or ethyl. More preferably still, at least one of $R^1$ and $R^2$ is H and the other is either H or methyl. Thus, preferably the polyketone comprises alternating carbonyl and alkylene units wherein each alkylene unit is either ethylene or propylene.

In a further preferred embodiment, the polyketone is of formula (Ia)

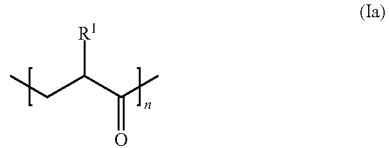

wherein:
each $R^1$ is independently H or $C_{1-4}$alkyl; and
n is from 100 to 10,000.

Preferably in formula (Ia) each $R^1$ is independently H or $C_{1-3}$alkyl, more preferably each $R^1$ is independently H, methyl or ethyl, and more preferably still each $R^1$ is independently H or methyl.

Preferred options for n are the same as set out above for formula (I).

As indicated above, the polyketone preferably comprises carbonyl units plus a mixture of units of both ethylene plus one or more alkylene groups having 3 to 6 carbon atoms, more preferably 3 to 5 carbon atoms, more preferably 3 or 4 carbon atoms, and most preferably 3 carbon atoms—i.e. most preferably the straight or branched alkylene units comprise a mixture of ethylene and propylene units. And in line with this, it is also preferred in (for instance) formula (Ia) that each $R^1$ is independently H or methyl. In these contexts, the proportion of ethylene groups vs other alkylene (e.g. propylene) groups in the polyketone is not particularly limited. However, typically the ratio of ethylene groups to other alkylene (e.g. propylene) groups is X:1, wherein X is from 0.1 to 1000.

Preferably X is at least 1.

Preferably X is no more than 500, such as no more than 300, no more than 200 or no more than 100.

Preferably the polyketone has a number average molecular weight as determined by gel permeation chromatography of at least 5,000 and more preferably at least 10,000, such as at least 20,000, at least 30,000, at least 40,000, at least 45,000, or at least 50,000.

Preferably the polyketone has a number average molecular weight as determined by gel permeation chromatography of up to 300,000 and more preferably up to 250,000, such as up to 200,000, up to 180,000, up to 160,000, up to 140,000 or up to 120,000.

Typical ranges for the number average molecular weight are 10,000 to 200,000, 40,000 to 140,000, and 50,000 to 120,000. In some cases, it can be useful to work at number average molecular weights nearer the bottom end of these preferred ranges, such as values in the region of 45,000 to 90,000, or 50,000 to 70,000, or 55,000 to 65,000. Working in these regions can facilitate processing steps such as injection moulding, as the polyketone then tends to have a higher melt flow index.

Preferably the polyketone has a melting temperature of at least 200° C., such as at least 205° C., at least 210° C., at least 213° C., at least 215° C., at least 217° C. or at least 219° C.

Preferably the polyketone has a melting temperature of 255° C. or less, more preferably 250° C. or less, such as 245° C. or less, 240° C. or less, 235° C. or less, 230° C. or less, or 225° C. or less.

Thus, the polyketone preferably has a melting temperature of 210 to 240° C., such as 215 to 230° C., or 220 to 225° C.

Melting temperature is preferably measured according to ASTM D3418.

Preferably the polyketone has a density of at least 1.10 g/cm³, such as at least 1.15 g/cm³, at least 1.18 g/cm³, or at least 1.20 g/cm³.

Preferably the polyketone has a density of 1.35 g/cm³ or less, such as 1.30 g/cm³ or less, 1.27 g/cm³ or less, or 1.25 g/cm³ or less.

Thus, the polyketone preferably has a density of 1.18 to 1.27 g/cm³, more preferably 1.20 to 1.25 g/cm³. Typically it is from 1.22 to 1.25 g/cm³.

Density is preferably measured according to ASTM D792.

The melt flow index of the polyketone may vary depending on the application and the importance of facilitating easy processing (e.g. injection molding). In some cases the melt flow index of the polyketone may be relatively low, with ranges such as e.g. ≥2 g/10 min, or ≥5 g/10 min according to ASTM D1238 (at 240° C. and using a weight of 2.16 kg) being suitable. Typically though it is relatively high, e.g. ≥40, ≥60, or ≥80 g/10 min. Preferably it is no more than 300, such as no more than 250 g/10 min.

Preferably the polyketone has a flexural strength of at least 50 MPa, such as at least 55 MPa, at least 57 MPa, or at least 58 MPa.

Preferably the polyketone has a flexural strength of 70 MPa or less, such as 65 MPa or less, 63 MPa or less, or 62 MPa or less.

Thus, the polyketone preferably has a flexural strength of 57 to 63 MPa, more preferably 58 to 62 MPa. Typically it is from 59 to 61 MPa, such as around 60 MPa.

Flexural strength is preferably measured according to ASTM D790 at 23° C.

Preferably the polyketone has a flexural modulus of at least 1400 MPa, such as at least 1450 MPa, at least 1500 MPa, or at least 1520 MPa.

Preferably the polyketone has a flexural modulus of 1800 MPa or less, such as 1750 MPa or less, 1700 MPa or less, or 1680 MPa or less.

Thus, the polyketone preferably has a flexural modulus of 1500 to 1700 MPa, more preferably 1520 to 1680 MPa. Typically it is from 1550 to 1650 MPa.

Flexural modulus is preferably measured according to ASTM D790 at 23° C.

Preferably the polyketone has a tensile strength at yield of at least 50 MPa, such as at least 52 MPa, at least 54 MPa, or at least 56 MPa.

Preferably the polyketone has a tensile strength at yield of 75 MPa or less, such as 72 MPa or less, 70 MPa or less, or 68 MPa or less.

Thus, the polyketone preferably has a tensile strength at yield of 52 to 70 MPa, more preferably 55 to 68 MPa. Typically it is from 57 to 66 MPa.

Tensile strength at yield is preferably measured according to ASTM D638 at 23° C.

Preferably the polyketone has a nominal strain at break of at least 50%, such as at least 100%, at least 120%, or at least 130%. In some cases it may be higher still, such as at least 150%, at least 200%, at least 250% or even 300% or higher. Typically it does not exceed 400%, though. Nominal strain at break is preferably measured according to ASTM D638 at 23° C.

Preferably the polyketone has a water absorption value of at least 0.3%, more preferably at least 0.4%, according to ASTM D570 at 23° C. and 50% relative humidity.

Preferably the polyketone has a water absorption value of 0.7% or less, more preferably 0.6% or less, according to ASTM D570 at 23° C. and 50% relative humidity.

Thus, the polyketone typically has a water absorption value of around 0.5% according to ASTM D570 at 23° C. and 50% relative humidity.

Preferably the polyketone has a flammability value of HB in the UL 94 test method (which is the lowest possible score, indicating good flame retardancy).

Suitable polyketones may be prepared by known methods—see, for instance, the earlier publications U.S. Pat. No. 2,495,286, GB1081304 and U.S. Pat. No. 3,694,412. Suitable polyketones are also available commercially, such as those sold under the trade name POKETONE® (e.g. POKETONE Polymer M930A, POKETONE Polymer M630A, and also the P100A and M200HSL products) or from the A. Schulman company (e.g. Schulaketon MV).

The polyketone is preferably obtained or obtainable by polymerising carbon monoxide and one or more alkenes. Preferred options for said one or more alkenes are the same as those indicated above (i.e. those from which the straight or branched alkylene units in the polyketone are preferably derived or derivable). Thus, preferably the polyketone is obtained or obtainable by polymerising carbon monoxide and a mixture of ethene plus an alpha olefin having 3 to 6 carbon atoms (typically propene).

Preferably, the polyketone is obtained or obtainable by polymerising carbon monoxide and one or more alkenes wherein the molar ratio of carbon monoxide to said one or more alkenes is from 10:1 to 1:10, more preferably from 5:1 to 1:5, or from 2:1 to 1:2.

Preferably, said one or more alkenes is a mixture of ethene plus an alpha olefin having 3 to 6 carbon atoms (typically propene), wherein the molar ratio of ethene to the alpha olefin having 3 to 6 carbon atoms is X:1, wherein X is from 0.1 to 1000.

Preferably X is at least 1.

Preferably X is no more than 500, such as no more than 300, no more than 200 or no more than 100.

In the helmet of the invention, the polyketone typically accounts for a major proportion of the first component. In some cases the first component may consist substantially of the polyketone, i.e. the polyketone is present in an amount of 100% by weight. However, in other cases the first component may also comprise further agents/additives, such as a dye, anti-aging additive, or colourant, provided that they do not interfere with the performance of the sliding interface. Preferably, the polyketone accounts for at least 80% by weight, such as at least at least 90%, at least 95%, or at least 98% by weight of the first component. Said further (optional) agents/additives, when present, typically account for at most 20% by weight of the first component. In particular, said further (optional) agents/additives, when present, preferably account for at most 20 by weight of the first component, such as at most 10%, at most 5%, or at most 2% by weight of the first component.

When one or more further agents are present, the polyketone and said one or more further agents are preferably present in the first component in the form of a mixture, more preferably a substantially homogeneous mixture. Typically the mixture is obtained or obtainable by a process as defined further below.

For the avoidance of doubt it may be noted that all of the aspects, embodiments, etc of the first component as set out above (and below) also apply specifically to the sliding surface of the first component. Thus, by way of example, in one preferred embodiment the first component (or the sliding surface thereof) comprises the polyketone in an amount of 80 to 98% by weight.

It has been found that there are some further (optional) agents/additives which, when used in combination with the polyketone, can enhance the performance of the sliding interface. When further (optional) agents/additives of this nature are being employed, higher amounts than the preferred quantities just mentioned above may be used. Thus, in one embodiment the first component may further comprise a performance enhancing additive. Preferably in this embodiment the polyketone accounts for at least 50% by weight, such as at least at least 60%, at least 70%, or at least 80% by weight of the first component. The performance enhancing additive preferably accounts for at most 50% by weight of the first component, such as at most 40%, at most 30%, or at most 20% by weight of the first component. The performance enhancing additive is preferably a siloxane or PTFE. The siloxane may be a polymeric siloxane or an oligomeric siloxane. The siloxane may be branched or unbranched. The siloxane may be of the general formula $[-\text{OSiR}_2-]_n$, wherein R is other than H, and typically R is a hydrocarbyl group, more typically an alkyl or aryl group, more typically still a lower alkyl (i.e. $C_{1-4}$ alkyl) or phenyl group (the value of n is not particularly limited—it may defined such that the number average molecular weight of the siloxane is from e.g. 500 to 1,000,000, or 1,000 to 500,000, or 2,000 to 100,000) A typical example is polydimethylsiloxane. Preferably the siloxane is present in the form of a silicone oil. Thus, most preferably the performance enhancing additive is silicone oil or PTFE.

When the first component comprises a performance enhancing additive (in addition to the polyketone), in some cases the first component may consist substantially of the polyketone and performance enhancing additive, i.e. the polyketone and performance enhancing additive are present in a combined amount of 100% by weight. However, in other cases when the first component comprises a performance enhancing additive (in addition to the polyketone), the first component may also comprise further agents/additives, such as a dye, anti-aging additive, or colourant, provided that they do not interfere with the performance of the sliding interface. In such cases, preferably the polyketone and performance enhancing additive together account for at least 80% by weight, such as at least at least 90%, at least 95%, or at least 98% by weight of the first component. Said further (optional) agents/additives, when present in such cases, preferably account for at most 20% by weight of the first component, such as at most 10%, at most 5%, or at most 2% by weight of the first component.

When the first component comprises a performance enhancing additive (in addition to the polyketone), the performance enhancing additive may be combined with the polyketone before being used to make the first component of the helmet of the invention. Thus, the starting material from which the first component is obtained/obtainable may comprise a mixture of the polyketone and said performance enhancing additive, more preferably a substantially homogeneous mixture. Some of the properties of such a starting material may be the same as (or similar to) those of the polyketone on its own, i.e. in the absence of the performance enhancing additive, but other properties may be different. Some preferred properties for such a starting material comprising the polyketone and the performance enhancing additive are set out below (for conciseness this is referred to below just as "the starting material").

Preferably the starting material has a melting temperature of at least 200° C., such as at least 205° C., at least 210° C., at least 213° C., at least 215° C., at least 217° C. or at least 219° C.

Preferably the starting material has a melting temperature of 255° C. or less, more preferably 250° C. or less, such as 245° C. or less, 240° C. or less, 235° C. or less, 230° C. or less, or 225° C. or less.

Thus, the starting material preferably has a melting temperature of 210 to 240° C., such as 215 to 230° C., or 220 to 225° C.

Melting temperature is preferably measured according to ASTM D3418.

Preferably the starting material has a density of at least 1.17 g/cm$^3$, such as at least 1.22 g/cm$^3$, at least 1.25 g/cm$^3$, or at least 1.27 g/cm$^3$.

Preferably the starting material has a density of 1.40 g/cm$^3$ or less, such as 1.35 g/cm$^3$ or less, 1.32 g/cm$^3$ or less, or 1.30 g/cm$^3$ or less.

Thus, the starting material preferably has a density of 1.25 to 1.35 g/cm$^3$, more preferably 1.26 to 1.33 g/cm$^3$. Typically it is from 1.27 to 1.30 g/cm$^3$.

Density is preferably measured according to ASTM D792.

The melt flow index of the starting material may vary depending on the application and the importance of facilitating easy processing (e.g. injection molding). In some cases the melt flow index of the starting material may be relatively low, with ranges such as e.g. ≥2 g/10 min, or ≥5 g/10 min according to ASTM D1238 (at 240° C. and using a weight of 2.16 kg) being suitable. Typically though it is relatively high, e.g. ≥40, ≥60, or ≥80 g/10 min. Preferably it is no more than 300, such as no more than 250 g/10 min.

Preferably the starting material has a flexural strength of at least 42 MPa, such as at least 47 MPa, at least 49 MPa, or at least 50 MPa.

Preferably the starting material has a flexural strength of 65 MPa or less, such as 60 MPa or less, 59 MPa or less, or 58 MPa or less.

Thus, the starting material preferably has a flexural strength of 45 to 60 MPa, more preferably 48 to 59 MPa. Typically it is from 50 to 58 MPa.

Flexural strength is preferably measured according to ASTM D790 at 23° C.

Preferably the starting material has a flexural modulus of at least 1200 MPa, such as at least 1250 MPa, at least 1300 MPa, or at least 1350 MPa.

Preferably the starting material has a flexural modulus of 1700 MPa or less, such as 1650 MPa or less, 1600 MPa or less, or 1550 MPa or less.

Thus, the starting material preferably has a flexural modulus of 1300 to 1600 MPa, more preferably 1330 to 1580 MPa. Typically it is from 1350 to 1550 MPa.

Flexural modulus is preferably measured according to ASTM D790 at 23° C.

Preferably the starting material has a tensile strength at yield of at least 40 MPa, such as at least 45 MPa, at least 48 MPa, or at least 50 MPa.

Preferably the starting material has a tensile strength at yield of 70 MPa or less, such as 65 MPa or less, 60 MPa or less, or 55 MPa or less.

Thus, the starting material preferably has a tensile strength at yield of 35 to 65 MPa, more preferably 40 to 60 MPa. Typically it is from 45 to 55 MPa, such as around 50 MPa.

Tensile strength at yield is preferably measured according to ASTM D638 at 23° C.

Preferably the starting material has a nominal strain at break of at least 25%, such as at least 30%, at least 35%, or at least 40%. Typically, though, it does not exceed 100%, 80% or 60%. A value of around 50% is particularly suitable. Nominal strain at break is preferably measured according to ASTM D638 at 23° C.

Preferably the starting material has a water absorption value of at least 0.1%, more preferably at least 0.2%, according to ASTM D570 at 23° C. and 50% relative humidity.

Preferably the starting material has a water absorption value of 0.6% or less, more preferably 0.5% or less, still more preferably 0.4% or less, according to ASTM D570 at 23° C. and 50% relative humidity.

Thus, the starting material typically has a water absorption value of around 0.3% according to ASTM D570 at 23° C. and 50% relative humidity.

Preferably the starting material has a flammability value of HB in the UL 94 test method (which is the lowest possible score, indicating good flame retardancy).

Suitable starting materials are available commercially, such as those sold under the trade names POKETONE Polymer M33AS1A and POKETONE Polymer M33AT2E.

The position of the first component within the helmet is not particularly limited, provided that the helmet comprises said first component plus a second component and that there is a sliding interface between the two components, wherein the sliding interface is provided between respective sliding surfaces of the first and second components.

As noted above, in a first arrangement, the helmet comprises at least one section having first and second layers, configured in use to be respectively further from the local surface of the head of a wearer of the helmet and closer to the local surface of the head of a wearer of the helmet; and the helmet is configured such that, in response to an impact on the helmet, the first layer can move relative to the second layer in a direction tangential to the local surface of the head. Preferred aspects of this arrangement include those wherein:

(a) the first layer comprises a relatively hard outer shell; the second layer comprises a shell formed from an impact energy absorbing material; and one of the first and second layers comprises the first component;

(b) the first and second layers comprise shells formed from an impact energy absorbing material; and one of the first and second layers comprises the first component;

(c) the first layer comprises a shell formed from an impact energy absorbing material; the second layer does not absorb a significant proportion of impact energy in comparison to the first layer, and one of the first and second layers comprises the first component (the second layer may comprise comfort padding);

(d) the helmet further comprises a connector, configured to connect the first and second layers of the helmet together but permit relative movement in the direction tangential to the local surface of the head in response to an impact on the helmet; wherein the connector comprises at least one of the first component and the second component; or (e) in addition to having the features of any one of (a) to (d) above, the helmet further comprises a connector, configured to connect the first and second layers of the helmet together but permit relative movement in the direction tangential to the local surface of the head in response to an impact on the helmet; wherein the connector comprises at least one of a second first component and a second second component.

The first component may be a sliding layer (or sliding facilitator) located between two parts of the helmet, which enables displacement between said two parts.

For instance, the first component may be a sliding layer (or a sliding facilitator) located between two layers (or shells) of the helmet, which enables displacement between said two layers (or shells). For example, the first component may be a sliding layer (or a sliding facilitator) located between an outer shell and an inner shell, which enables displacement between the outer shell and the inner shell. The inner shell may be an energy absorbing layer. The outer shell may be a relatively thin and strong material suitable for withstanding impact of various type, i.e. an impact resistant material. Alternatively, the outer shell may be a (second) energy absorbing layer. The second component may be either the two layers (or shells) of the helmet. For instance, the second component may be the aforementioned inner shell or outer shell.

The first component may be a sliding layer (or a sliding facilitator) located between a layer (or shell) of the helmet and one or more connectors, which sliding layer (or facilitator) enables displacement between said layer (or shell) and said one or more connectors. The shell may be an energy absorbing layer. The second component may be said layer (or shell) of the helmet or said one or more connectors.

The first component may be one or more connectors configured to connect two parts of the helmet, wherein at least one of said two parts is a layer (or shell) of the helmet, and wherein the connector enables displacement between the two parts. The second component may be either of the two parts of the helmet—e.g. the second component may be the layer (or shell) of the helmet.

In one arrangement the second component may, independently, be defined in the same way as the first component is defined above, but this is not necessary for achieving the enhanced performance of the sliding interface. Thus, the nature of the second component is not particularly limited, and the second component may be composed of one or more other materials, such as those used to form one of the other parts of the helmet.

In one embodiment the second component comprises (and preferably is substantially composed of) an energy absorbing material. Preferably the material is a polymer. Preferably the material is a foam. Typically the material is a polymer in the form of a foam. Suitable foams include expanded polystyrene (EPS), expanded polypropylene (EPP), expanded polyurethane (EPU), and vinyl nitrile. These options for the second component are of particular relevance to arrangements where the second component is an energy absorbing layer (or shell) of the helmet.

In one embodiment the second component comprises (and preferably is substantially composed of) a relatively thin and strong material suitable for withstanding impact of various types, i.e. an impact resistant material. Preferred options for the impact resistant material in this regard and also generally herein, are polymer materials such as polycarbonate (PC), polyvinylchloride (PVC) or acrylonitrile butadiene styrene (ABS) for example. Advantageously, the polymer material can be fibre-reinforced, using materials such as glass-fibre, Aramid, Twaron, carbon-fibre or Kevlar. These options for the second component are of particular relevance to arrangements where the second component is an outer layer (or shell) of the helmet.

As well as providing a helmet, the present invention also provides a process of producing a component for a helmet, and a process of producing a helmet.

Thus, the present invention provides a process of producing a first component for use in forming a sliding interface in a helmet; wherein the sliding interface is provided between respective sliding surfaces of the first component and a second component of the helmet; and wherein the process comprises producing the first component, or an intermediate product from which the first component is formed, by a method which includes a step of injection moulding the polyketone plus optionally one or more further agents to produce the first component or intermediate product. Preferred aspects of the polyketone in this regard are the same as those set out above in connection with the definition of the first component of the helmet of the invention.

In this regard, when the polyketone is used in combination with one or more further agents, the present invention also provides a process of producing a first component for use in forming a sliding interface in a helmet; wherein the sliding interface is provided between respective sliding surfaces of the first component and a second component of the helmet; and wherein the process comprises producing the first component, or an intermediate product from which the first component is formed, by a method which includes a step of forming a mixture of a polyketone and one or more further agents. Preferred aspects of the polyketone in this regard are the same as those set out above in connection with the definition of the first component of the helmet of the invention. In one aspect, the process comprises blending the polyketone and said one or more further agents so as to form the mixture. In one aspect, the process comprises injection moulding the mixture to produce the first component. In one aspect, the process comprises blending the polyketone and said one or more further agents so as to form the mixture, and a subsequent step of injection moulding the mixture to produce the first component. However, it is not necessary for the injection moulding step to follow directly after the blending step. For instance, in one aspect the blending step may take place at one point in time, with the subsequent injection moulding step taking place at a later point in time, potentially at a different location and/or after one or more additional intervening modification steps (provided that there remains a mixture comprising, inter alia, the polyketone and said one or more further agents).

The present invention also provides a process of producing a helmet, which process comprises producing a first component by a process as defined above, and a subsequent step in which the component is assembled into a helmet.

EXAMPLES

Samples were prepared and then subjected to testing to assess their ability to protect against impacts, and oblique impacts in particular. An angled anvil test rig was used. In each case the test was performed with a free-falling instrumented Hybrid III dummy head form and helmet which impacted a 45-degree angled impact anvil. The helmet contact point was controlled during the drop. The oblique impact results in a combination of linear/translational and angular/rotational acceleration that is more realistic than common test methods, where helmets are dropped in pure vertical impact to the horizontal impact surface. In the dummy head there is a system of nine accelerometers mounted to measure the linear/translational accelerations and rotational accelerations around all axes. The helmets were dropped from a height of 2.2 m, resulting in a vertical speed of approximately 6.2±0.05 m/s.

Figure 21:
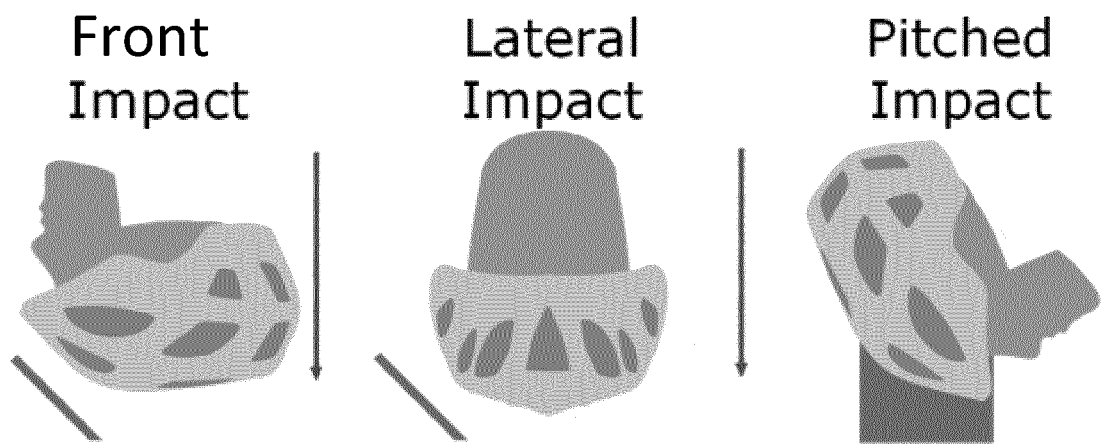
FIG. 21 schematically depicts the three different impact directions that were used to assess the ability of helmets to protect against impacts.
Figure 22:
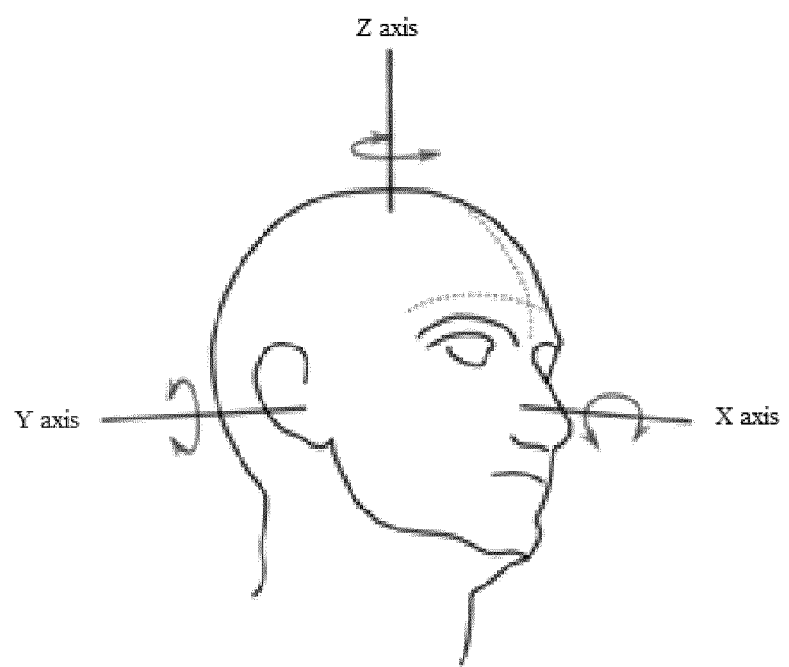
FIG. 22 schematically depicts the spatial positions of the X, Y and Z-axes in relation to the human head.

Three different impact locations with different impact directions were tested. These impacts are specified as Front (V rotation) impact direction, lateral (X rotation) impact direction and pitched (Z rotation) impact direction. These impacts are depicted in FIG. 21. For the Front impact, rotational acceleration of the head/helmet is recorded around the Y-axis with an initial tilt of 0±1 degrees. For the pitched impact, rotational acceleration of the head/helmet is recorded around the Z-axis with an initial tilt of 25±1 degrees. For the lateral impact, rotational acceleration of the head/helmet is recorded around the X-axis with an initial tilt of 0±1 degrees. FIG. 22 (an adapted version of the Figure available from Ildar Farkhatdinov. Modelling verticality estimation during locomotion. Automatic. Université Pierre et Marie Curie—Paris VI, 2013. English) shows how the X, Y and Z-axes described above exist spatially in relation to the human head. Samples were tested for all three impact directions at room temperature.

In addition, $1^{st}$ principal strain values were computed by a validated Finite Element (FE) model of the human brain using the acceleration signals from the experimental data collected from the Hybrid III dummy head during impact testing (see (i) Kleiven, S. (2002), Finite Element Modeling of the Human Head. Doctoral Thesis. Technical Report 2002-9, Department of Aeronautics, Royal Institute of Technology, Stockholm, Sweden; (ii) Kleiven, S. (2006), Evaluation of head injury criteria using an FE model validated against experiments on localized brain motion, intra-cerebral acceleration, and intra-cranial pressure, International Journal of Crashworthiness 11 (1), 65-79; and (iii) Kleiven, S. (2007), Predictors for Traumatic Brain Injuries Evaluated through Accident Reconstructions, Stapp Car Crash Journal 51, 81-114). Helmets showing reductions of 10 to 60% in strain (compared to the same helmet without the first component) for all impact directions were considered to be significantly improved.

Example 1

Three different types of helmet were made and subjected to testing in the manner described above.

Helmet 1 was according to the invention. The polyketone employed was a commercially available polyketone (containing a minor amount of dye), available from the Hyosung company under the trade name P100A-Compound. The polyketone pellets were injection moulded in order to produce a first component in the shape of a layer, which was then assembled into a helmet. The first component was present in the form of a low friction layer arranged between an energy absorbing foam layer (which was made of EPS) and the comfort padding which rests towards the test head form. The P100A-Compound polyketone is believed to consist essentially of alternating carbonyl and alkylene units, wherein each alkylene unit is independently ethylene or propylene. It had a melting temperature of 222° C. according to ASTM D3418.

Helmet 2 (control) was the same as Helmet 1 subject to the omission of the first component.

Helmet 3 (reference example) was the same as Helmet 1 subject to (a) using polypropylene instead of polyketone; and (b) it contained sliding enablers mounted to the energy absorbing foam layer between the first component and the energy absorbing foam layer (the sliding enablers were soft/loop Velcro strips that were glued to the foam layer—without these, the polypropylene component was found not to function well enough as a sliding layer/facilitator).

The helmets were subjected to front, lateral and pitched impacts. Rotational velocity, rotational acceleration and translational acceleration were measured and the $1^{st}$ principal strain calculated. The results are summarised in Table 1.

TABLE 1

| Helmet | Impact | Resultant Translational Acceleration (g) | Resultant Rotational Acceleration (krad/s$^2$) | Resultant Rotational Velocity (rad/s) | $1^{st}$ Principal Strain |
|---|---|---|---|---|---|
| 1 | Front | 99.2 | 5.1 | 27.1 | 0.29 (29%) |
|   | Lateral | 124.6 | 5.0 | 21.8 | 0.18 (18%) |
|   | Pitched | 109.8 | 5.9 | 24.6 | 0.29 (29%) |
| 2 | Front | 115.7 | 8.2 | 35.3 | 0.39 (39%) |
|   | Lateral | 137.4 | 7.5 | 29.7 | 0.26 (26%) |
|   | Pitched | 115.7 | 7.4 | 33.2 | 0.37 (37%) |
| 3 | Front | 100.9 | 6.5 | 31.8 | 0.34 (34%) |
|   | Lateral | 125.3 | 5.6 | 25.7 | 0.21 (21%) |
|   | Pitched | 109.7 | 6.2 | 27.3 | 0.30 (30%) |

The percent reduction values for Helmet 1 compared to Helmet 2 (Comparison A) and the percent reduction values for Helmet 3 compared to Helmet 2 (Comparison B) are given in Table 2.

TABLE 2

|  | Comparison | Impact | Resultant Translational Acceleration | Resultant Rotational Acceleration | Resultant Rotational Velocity | $1^{st}$ Principle Strain |
|---|---|---|---|---|---|---|
| Reduction (%) | A | Front | 14.3 | 37.4 | 23.2 | 27.4 |
|  |  | Lateral | 9.3 | 33.2 | 26.6 | 30.9 |
|  |  | Pitched | 5.1 | 21.4 | 25.8 | 20.1 |
|  | B | Front | 12.8 | 20.8 | 10.1 | 13.0 |

TABLE 2-continued

| Comparison | Impact | Resultant Translational Acceleration | Resultant Rotational Acceleration | Resultant Rotational Velocity | $1^{st}$ Principle Strain |
|---|---|---|---|---|---|
| | Lateral | 8.8 | 26.1 | 13.5 | 18.3 |
| | Pitched | 5.1 | 16.7 | 17.8 | 17.5 |

The beneficial effects of introducing the first component can be seen from the positive reduction values for all of the measured properties in Comparison A. Also, the fact that the polyketone (in Helmet 1) enabled the same or better performance (and often significantly better performance) than the alternative polymer (polypropylene) which was used in Helmet 3, even despite the fact that Helmet 3 additionally included sliding enablers, reinforces the surprising nature of the robust performance levels reported herein for the polyketone-containing helmets.

It can also be seen that Helmet 1 provides highly effective impact protection, as is evidenced by the greater than 20% decrease in $1^{st}$ principal strain observed for all impacts.

Example 2

In a similar fashion to Example 1, two helmets were made and subjected to testing to assess their ability to protect against impacts. The helmets differed only in terms of the presence/absence of a first component as defined herein, as set out below.

Helmet 4 was according to the invention. The polyketone employed was a commercially available polyketone containing a minor amount of dye, available from the Hyosung company under the trade name P100A-. Pellets of the polyketone were injection moulded in order to produce a first component in the shape of a layer, which was then assembled into a helmet. The first component was present in the form of a low friction layer arranged between an energy absorbing foam layer and the comfort padding which rests towards the test head form.

Helmet 5 (the control) was the same as Helmet 4 subject to the omission of the first component.

The helmets were subjected to three different types of impact—front, lateral and pitched. The $1^{st}$ principal strain values were also computed. The percentage reductions for Helmet 4 compared to Helmet 5 for various properties are summarised below in Table 3.

TABLE 3

| | Impact | Resultant Translational Acceleration | Resultant Rotational Acceleration | Resultant Rotational Velocity | $1^{st}$ Principle Strain |
|---|---|---|---|---|---|
| Reduction (%) | Front | 1.0 | 27.3 | 19.1 | 21.0 |
| | Lateral | 4.4 | 35.6 | 19.6 | 27.7 |
| | Pitched | 12.8 | 42.4 | 33.5 | 26.5 |

The beneficial effects of introducing the first component can be seen from the positive reduction values for all of the measured properties. The effect during pitched impact on Resultant Rotational Acceleration and also Resultant Rotational Velocity is particularly noteworthy. It can also be seen that Helmet 4 provides highly effective impact protection, as is evidenced by the greater than 20% decrease in $1^{st}$ principal strain observed for all three types of impact.

Example 3

In a similar fashion to Examples 1 and 2, four helmets were made and subjected to testing to assess their ability to protect against impacts. The helmets differed only in terms of the presence/absence of a first component as defined herein, as set out below.

Helmet 6 was according to the invention. Pellets of polyketone were injection moulded in order to produce a first component in the shape of a layer, which was then assembled into a helmet. The first component was present in the form of a low friction layer arranged between an energy absorbing foam layer and the comfort padding which rests towards the test head form.

Helmet 7 was according to the invention and was the same as Helmet 6 subject to the nature of the first component: for Helmet 7, the first component was produced by injection moulding a commercially available material sold by the Hyosung company under the trade name M33AT2E, which material comprised a polyketone in combination with 10% by weight of PTFE (as a performance enhancing additive).

Helmet 8 was according to the invention and was the same as Helmet 6 subject to the nature of the first component: for Helmet 8, the first component was produced by injection moulding a commercially available material sold by the Hyosung company under the trade name M33AS1A, which material comprised a polyketone in combination with 2% by weight of silicone oil (as a performance enhancing additive).

Helmet 9 (the control) was the same as Helmet 6 subject to the omission of the first component.

The helmets were subjected to front, lateral and pitched impacts. Rotational velocity, rotational acceleration and translational acceleration were measured and the $1^{st}$ principal strain calculated. This was then repeated once. The average (mean) results are summarised in Table 4.

TABLE 4

| Helmet | Impact | Resultant Translational Acceleration (g) | Resultant Rotational Acceleration (krad/s²) | Resultant Rotational Velocity (rad/s) | $1^{st}$ Principal Strain |
|---|---|---|---|---|---|
| 6 | Front | 106.5 | 5.0 | 24.4 | 0.26 (26%) |
| | Lateral | 122.6 | 5.0 | 21.9 | 0.18 (18%) |
| | Pitched | 104.0 | 6.3 | 34.1 | 0.39 (39%) |
| 7 | Front | 103.6 | 2.2 | 15.0 | 0.12 (12%) |
| | Lateral | 117.3 | 4.3 | 19.5 | 0.15 (15%) |
| | Pitched | 101.1 | 4.5 | 29.4 | 0.33 (33%) |
| 8 | Front | 108.8 | 2.7 | 16.1 | 0.14 (14%) |
| | Lateral | 117.3 | 4.5 | 19.6 | 0.16 (16%) |
| | Pitched | 108.3 | 5.0 | 29.7 | 0.35 (35%) |
| 9 | Front | 109.7 | 7.3 | 34.3 | 0.38 (38%) |
| | Lateral | 140.9 | 7.8 | 35.0 | 0.30 (30%) |
| | Pitched | 112.4 | 10.0 | 44.9 | 0.49 (49%) |

The percent reduction values for Helmet 6 compared to Helmet 9 (Comparison C), for Helmet 7 compared to Helmet 9 (Comparison D), and for Helmet 8 compared to Helmet 9 (Comparison E) are given in Table 5.

TABLE 5

| Comparison | Impact | Resultant Translational Acceleration | Resultant Rotational Acceleration | Resultant Rotational Velocity | 1$^{st}$ Principle Strain |
|---|---|---|---|---|---|
| Reduction (%) for Comparison C (6 vs 9) | Front | 2.9 | 32.0 | 28.7 | 30.7 |
|  | Lateral | 13.0 | 36.2 | 37.6 | 40.3 |
|  | Pitched | 7.5 | 37.3 | 23.9 | 19.9 |
| Reduction (%) for Comparison D (7 vs 9) | Front | 5.5 | 69.8 | 56.3 | 68.9 |
|  | Lateral | 16.8 | 44.7 | 44.2 | 50.7 |
|  | Pitched | 10.0 | 55.3 | 34.5 | 32.4 |
| Reduction (%) for Comparison E (8 vs 9) | Front | 0.8 | 63.5 | 53.2 | 63.7 |
|  | Lateral | 16.8 | 5.3 | 44.1 | 47.7 |
|  | Pitched | 3.6 | 50.6 | 33.8 | 29.2 |

The beneficial effects of introducing the first component can be seen from the positive reduction values for all of the measured properties in Comparisons C to E. It can also be seen that Helmets 7 and 8 in particular provide highly effective impact protection, as is evidenced (e.g.) by the greater than 29% decrease in 1$^{st}$ principal strain observed for all impacts.

The invention claimed is:

1. A helmet, comprising first and second components having a sliding interface between them, wherein the sliding interface is provided between respective sliding surfaces of the first and second components, and the first component comprises a polyketone, wherein the polyketone has a density of 1.10 g/cm$^3$ to 1.27 g/cm$^3$.

2. The helmet according to claim 1, wherein the polyketone comprises carbonyl units plus straight or branched alkylene units having 2 to 6 carbon atoms.

3. The helmet according to claim 2, wherein the straight or branched alkylene units are derived from one or more alpha olefins having 2 to 6 carbon atoms.

4. The helmet according to claim 2, wherein the polyketone comprises carbonyl units plus a mixture of ethylene and propylene units.

5. The helmet according to claim 1, wherein the polyketone has a number average molecular weight of 50,000 to 120,000, and a melting temperature of 215 to 230° C.

6. The helmet according to claim 1, wherein the second component comprises an energy absorbing material.

7. The helmet according to claim 1, wherein the helmet comprises at least one section having first and second layers, configured in use to be respectively further from the local surface of the head of a wearer of the helmet and closer to the local surface of the head of a wearer of the helmet; and the helmet is configured such that, in response to an impact on the helmet, the first layer can move relative to the second layer in a direction tangential to the local surface of the head.

8. The helmet according to claim 7, wherein the first layer comprises a relatively hard outer shell; the second layer comprises a shell formed from an impact energy absorbing material; and one of the first and second layers comprises the first component.

9. The helmet according to claim 7, wherein the first and second layers comprise shells formed from an impact energy absorbing material; and one of the first and second layers comprises the first component.

10. The helmet according to claim 7, wherein the first layer comprises a shell formed from an impact energy absorbing material; the second layer does not absorb a significant proportion of impact energy in comparison to the first layer, and one of the first and second layers comprises the first component.

11. The helmet according to claim 10, wherein the second layer comprises comfort padding.

12. The helmet according to claim 7, further comprising a connector, configured to connect the first and second layers of the helmet together but permit relative movement in the direction tangential to the local surface of the head in response to an impact on the helmet;

wherein the connector comprises at least one of the first component and the second component.

13. The helmet according to claim 7, further comprising a connector, configured to connect the first and second layers of the helmet together but permit relative movement in the direction tangential to the local surface of the head in response to an impact on the helmet;

wherein the connector comprises at least one of a second first component and a second second component.

14. A process of producing a helmet as defined in claim 1, which process comprises:
(a) a process of producing a first component for use in forming a sliding interface in a helmet; wherein the sliding interface is provided between respective sliding surfaces of the first component and a second component of the helmet; and wherein the process comprises producing the first component, or an intermediate product from which the first component is formed, by a method which includes a step of forming a mixture of a polyketone and one or more further agents; and
(b) a subsequent step in which the component is assembled into a helmet, wherein the helmet comprises said first component and a second component, and has a sliding interface between the first and second components, wherein the sliding interface is provided between respective sliding surfaces of the first and second components, and the first component comprises a polyketone, wherein the polyketone has a density of 1.10 g/cm$^3$ to 1.27 g/cm$^3$.

15. The process according to claim 14, wherein the polyketone comprises carbonyl units plus straight or branched alkylene units having 2 to 6 carbon atoms.

* * * * *